(12) United States Patent
Kida et al.

(10) Patent No.: US 9,921,430 B2
(45) Date of Patent: Mar. 20, 2018

(54) DISPLAY COMPONENT INCLUDING AN ALIGNMENT FILM HAVING A THICKNESS VARIATION PORTION ON A FILM FORMING CONTROL PORTION

(71) Applicant: Sharp Kabushiki Kaisha, Osaka-shi, Osaka (JP)

(72) Inventors: Tetsuya Kida, Osaka (JP); Yutaka Sawayama, Osaka (JP); Hiroyuki Okazoe, Osaka (JP); Yoshiyuki Ihara, Osaka (JP)

(73) Assignee: Sharp Kabushiki Kaisha, Sakai (JP)

(*) Notice: Subject to any disclaimer, the term of this patent is extended or adjusted under 35 U.S.C. 154(b) by 115 days.

(21) Appl. No.: 14/897,712

(22) PCT Filed: Jul. 18, 2014

(86) PCT No.: PCT/JP2014/069167
§ 371 (c)(1),
(2) Date: Dec. 11, 2015

(87) PCT Pub. No.: WO2015/025657
PCT Pub. Date: Feb. 26, 2015

(65) Prior Publication Data
US 2016/0124255 A1 May 5, 2016

(30) Foreign Application Priority Data
Aug. 20, 2013 (JP) .................. 2013-170498

(51) Int. Cl.
*G02F 1/1335* (2006.01)
*G02F 1/1337* (2006.01)
*G02F 1/1333* (2006.01)

(52) U.S. Cl.
CPC ...... *G02F 1/1337* (2013.01); *G02F 1/133512* (2013.01); *G02F 1/133514* (2013.01);
(Continued)

(58) Field of Classification Search
CPC ......... G02F 1/133512; G02F 1/133514; G02F 1/1337; G02F 2001/133388; G02F 2001/133776
See application file for complete search history.

(56) References Cited

U.S. PATENT DOCUMENTS 5,671,030 A * 9/1997 Ohnuma ............... G02F 1/1339
349/106
2004/0227895 A1* 11/2004 Yoo .................. G02F 1/133516
349/152
(Continued)

FOREIGN PATENT DOCUMENTS

JP 06289219 A * 10/1994
JP 09-329786 A 12/1997
(Continued)

OTHER PUBLICATIONS

Official Communication issued in International Patent Application No. PCT/JP2014/069167, dated Oct. 7, 2014.

*Primary Examiner* — Huyen Ngo
(74) *Attorney, Agent, or Firm* — Keating & Bennett, LLP

(57) ABSTRACT

A display component includes a glass substrate GS including a display area AA and a non-display area NAA surrounding the display area AA, a color filter 29 overlapping a surface of the glass substrate GS in the display area AA, a CF board side alignment film 32 disposed in at least the display area AA to cover the color filter 29 and partially including a thickness variation portion 36 that gradually decreases thickness thereof toward an outer side, and a film forming control portion 37 disposed in the non-display area NAA to be next to the display area AA and overlapping the surface of the glass substrate GS and configured to form the CF board side alignment film 32 such that the thickness variation portion 36 is in the non-display area NAA.

8 Claims, 21 Drawing Sheets

(52) U.S. Cl.
CPC ............ *G02F 2001/133388* (2013.01); *G02F 2001/133776* (2013.01)

(56) References Cited

U.S. PATENT DOCUMENTS

| | | |
|---|---|---|
| 2007/0091247 A1 | 4/2007 | Onda |
| 2009/0110868 A1 | 4/2009 | Suzuki |
| 2012/0086899 A1 | 4/2012 | Suzuki |
| 2012/0300163 A1 | 11/2012 | Moriwaki et al. |

FOREIGN PATENT DOCUMENTS

| | | | |
|---|---|---|---|
| JP | 11119207 A | * | 4/1999 |
| JP | 11307017 A | * | 11/1999 |
| JP | 2004-144972 A | | 5/2004 |
| JP | 2009-106846 A | | 5/2009 |
| JP | 4768393 B2 | | 9/2011 |
| JP | 5306138 B2 | * | 10/2013 |
| WO | 2011/086624 A1 | | 7/2011 |

* cited by examiner

DISPLAY COMPONENT INCLUDING AN ALIGNMENT FILM HAVING A THICKNESS VARIATION PORTION ON A FILM FORMING CONTROL PORTION

TECHNICAL FIELD

The present invention relates to a display component, a display device, and a television device.

BACKGROUND ART

A liquid crystal panel, which is a major component of a liquid crystal display device, is configured as follows. The liquid crystal panel includes at least a pair of glass substrates, liquid crystals sandwiched between the substrates, and alignment films provided inner plate surfaces of the respective substrates to align the liquid crystals. Such a liquid crystal panel described in Patent Document 1 has been known.

RELATED ART DOCUMENT

Patent Document

Patent Document 1: Japanese Granted Patent Publication No. 4768393

Problem to be Solved by the Invention

Patent Document 1 describes a print control pattern interposed between a sealing member and a display area, and the print control pattern is configured to include concave structures or convex structures in a repeated way so that an alignment member that forms the alignment films is not needed.

One of the substrates in pair constituting the liquid crystal panel, that is, a CF board including a color filter is defined into a display area and a non-display area surrounding the display area. A color filter having a relatively great film thickness is disposed in the display area and a light blocking layer having a relatively small film thickness is disposed in the non-display area. Namely, the CF board has difference in thickness between the display area and the non-display area. Therefore, when a liquid material for forming the alignment films is supplied in a manufacturing process, the liquid material is likely to flow from the display area toward the non-display area and this may cause a problem that the alignment film has a portion whose film thickness decreases gradually toward an outer side ranging from the display area to the non-display area.

DISCLOSURE OF THE PRESENT INVENTION

The technology disclosed herein was made in view of the above circumstances. An object is to provide a technology to provide a uniform film thickness of an alignment film.

Means for Solving the Problem

A display component according to the present invention includes a base board including a display area and a non-display area surrounding the display area, a display element overlapping a surface of the base board in the display area, an alignment film disposed in at least the display area and covering the display element and partially including a thickness variation portion that gradually decreases thickness thereof toward an outer side thereof, and a film forming control portion disposed in the non-display area and next to the display area and overlapping the surface of the base board and configured to form the alignment film such that the thickness variation portion is in the non-display area.

In forming the alignment film, a material for the alignment film that is in a liquid state is applied on the display area of the base board where the display element is disposed. The material flows and spreads on the base board to form the alignment film. The display element overlaps a surface of the display area of the base board. Therefore, level difference is caused between a surface of the display element and a surface of the base board in the non-display area. According to such a configuration, when the alignment film is formed, the alignment film may partially include the thickness variation portion in the display area. The thickness variation portion decreases the thickness thereof toward the outer side thereof. The film forming control portion is disposed to overlap the surface of the base board in a portion of the non-display area next to the display area. Therefore, the alignment film is formed such that the thickness variation portion is disposed in the non-display area. Accordingly, the thickness of the alignment film is uniform in the display area, and display quality of display using the display component is improved.

The Preferable embodiments may include the following configurations.

(1) The film forming control portion may surround an entire periphery of the display area. According to such a configuration, in forming the alignment film, the film forming control portion surrounding the entire periphery of the display area restricts the alignment film to be formed such that the thickness variation portion is in the non-display area. Therefore, the thickness variation portion is not formed in the display area.

(2) The film forming control portion may have a surface at a height greater than a height of a surface of the display element. According to such a configuration, when the material for forming the alignment film is applied on the display area to form the alignment film, the material stays within the display area by the film forming control portion that surrounds the entire periphery of the display area and whose surface is at a height greater than a height of the surface of the display element. Then, the material goes on the film forming control portion and flows toward the non-display area. Accordingly, the thickness variation portion is further reliably disposed in the non-display area and the thickness of the alignment film is effectively uniform in the display area.

(3) The display component may further include a second base board to be attached to the base board opposite each other with having a clearance therebetween, liquid crystals sandwiched between the base board and the second base board, and a sealing member surrounding the liquid crystals and being between the base board and the second base board and sealing the liquid crystals. The film forming control portion may be closer to the display area than the sealing member and spaced from the second base board with having a clearance. According to such a configuration, the liquid crystals sandwiched between the base board and the second board are sealed by the sealing member that surrounds the liquid crystals. The film forming control portion disposed on the base board is spaced from the second board with the clearance therebetween. Therefore, when the liquid crystals that are dropped in the display area spread according to the bonding of the base board and the second board, the liquid crystals easily reach the sealing member through the clearance between the film forming control portion and the second board. Accordingly, air is less likely to stay within the space surrounded by the sealing member between the boards. Therefore, air bubbles are less likely to be generated in the liquid crystals and display quality of display using the display component is less likely to be deteriorated.

(4) The display component may further include a light blocking portion disposed in at least the non-display area to overlap the surface of the base board and having a height smaller than that of the display element. According to such a configuration, the light blocking portion that overlaps the surface of the base board at least in the non-display area projects less than the display element. Therefore, level difference is generated between the surface of the display element in the display area and the surface of the light blocking portion in the non-display area. The thickness variation portion may be likely to be formed in a part of the alignment film due to the level difference. The film forming control portion overlaps the surface of the light blocking portion in the non-display area. According to such a configuration, the alignment film is formed such that the thickness variation portion is formed in the non-display area and therefore, the thickness of the alignment film is effectively uniform in the display area.

(5) The film forming control portion may be made of a material same as that of the display element and has a thickness equal to that of the display element. According to such a configuration, the film forming control portion is formed in the process of forming the display element in manufacturing the display component. When the display element and the film forming control portion having the same thicknesses are formed with patterning by the photolithography method, complicated photo masks such as a half tone mask or a gray tone mask are not necessary. Therefore, the film forming control portion is easily formed at low cost.

(6) The display element may be a color filter that selectively transmits light having a specific wavelength region, and the film forming control portion may be made of a material same as that of the color filter. If the film forming control portion is made of the same material as that of the light blocking portion and the light blocking portion and the film forming control portion are formed with patterning by the photolithography method, a half tone mask or a gray tone mask is necessary as a photo mask. In this embodiment, the film forming control portion is made of the same material as that of the display element. Therefore, a half tone mask or a gray tone mask is not necessarily used as the photo mask and the film forming control portion is easily formed at low cost.

(7) The color filter may include color portions that are arranged in a matrix with a planar arrangement in the display area, and the film forming control portion may be continuous from one of the color portions that is at an edge of the display area. According to such a configuration, any step or gap is less likely to be generated between the film forming control portion and the color portion that is at the edge of the display area. Therefore, in the above configuration, the cross-sectional shape of the alignment film to be formed is less likely to be complicated and it is more effective to keep the uniformity of the thickness of the alignment film compared to the configuration where the film forming control portion is disposed away from the color portion that is at the edge of the display area.

(8) The display component may further include a light blocking portion disposed in at least the non-display area and overlapping the surface of the base board. The film forming control portion may overlap the light blocking portion in the non-display area and is made of a material same as that of the light blocking portion. If the film forming control portion is made of a material different from that of the light blocking portion, the material is required to satisfy the conditions such as wettability with respect to the light blocking portion. On the other hand, if the film forming control portion is made of the same material as that of the light blocking portion, such conditions are not necessary to be considered.

(9) The display component may further include a second base board to be attached to the base board opposite each other with having a clearance therebetween, liquid crystals sandwiched between the base board and the second base board, and a sealing member surrounding the liquid crystals and being between the base board and the second base board and sealing the liquid crystals. The film forming control portion may be disposed close to the display area and spaced from the sealing member with having a clearance. According to such a configuration, the liquid crystals sandwiched between the base board and the second board are surrounded and sealed by the sealing member. The film forming control portion is disposed near the display area spaced from the sealing member with the clearance. Therefore, in forming the alignment film, even if the material for forming the alignment film goes over the film forming control portion and spreads to the sealing member side in the non-display area, the material is less likely to reach the sealing member. Accordingly, the alignment film is less likely to overlap the sealing member and the sealing property is less likely to be adversely affected.

A display device according to the present invention includes the above display component. According to such a display device, the alignment film is formed such that the thickness variation portion is in the non-display area by the film forming control portion. Therefore, the display quality of the display device is improved.

A television device according to the present invention includes the above display device. According to such a television device, the display quality of the display device is improved and therefore, television images with excellent display quality are displayed.

Advantageous Effect of the Invention

According to the present technology, a film thickness of an alignment film can be uniform.

MODE FOR CARRYING OUT THE INVENTION

First Embodiment

Figure 1:
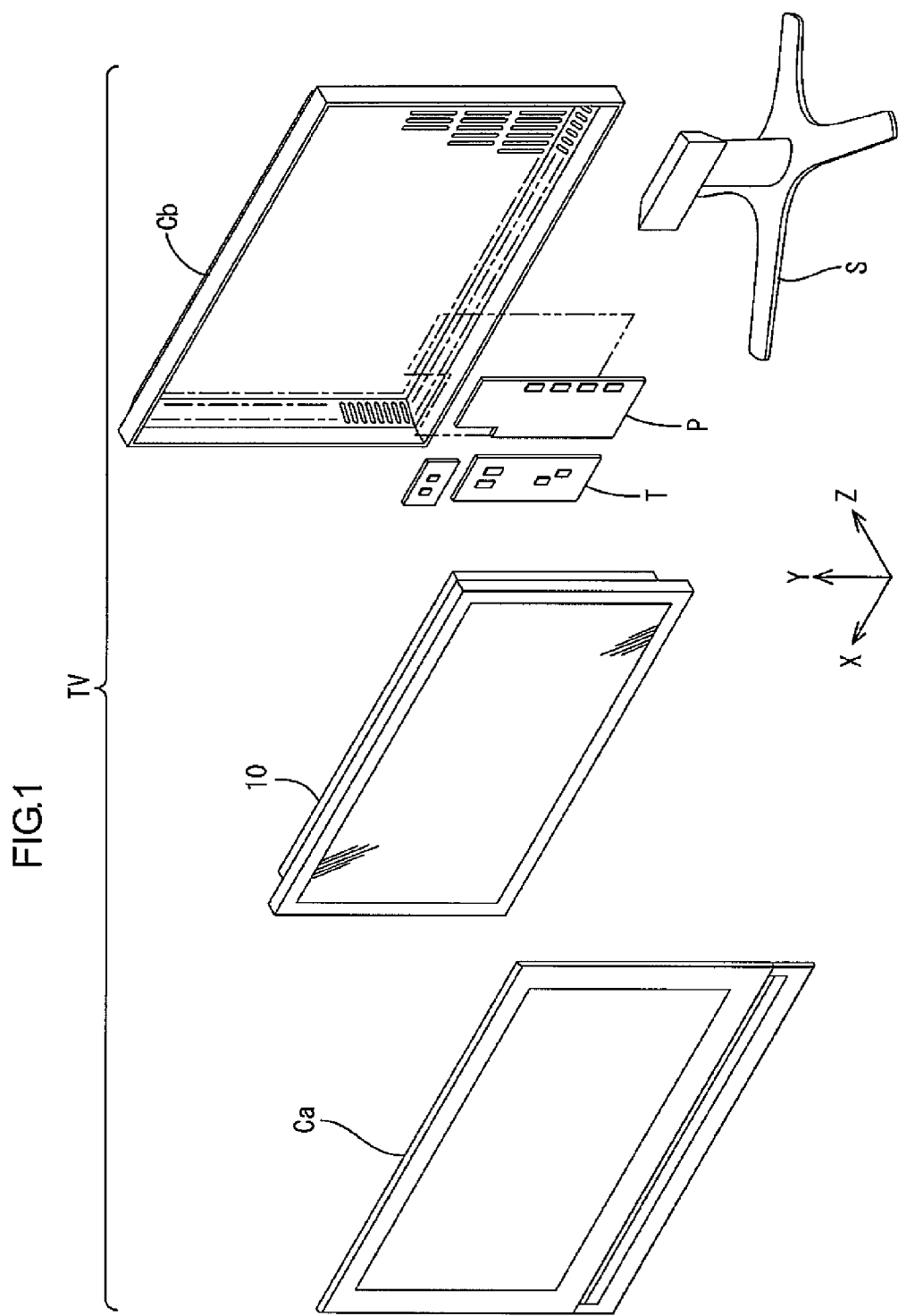
FIG. 1 is an exploded perspective view illustrating a general configuration of a television device according to a first embodiment.

A first embodiment will be described with reference to FIGS. 1 to 12. A liquid crystal display device 10 will be described in this description. X-axis, Y-axis and Z-axis may be indicated in the drawings. The axes in each drawing correspond to the respective axes in other drawings. The upper side and the lower side in FIG. 3 correspond to the front side and the rear side, respectively.

Figure 2:
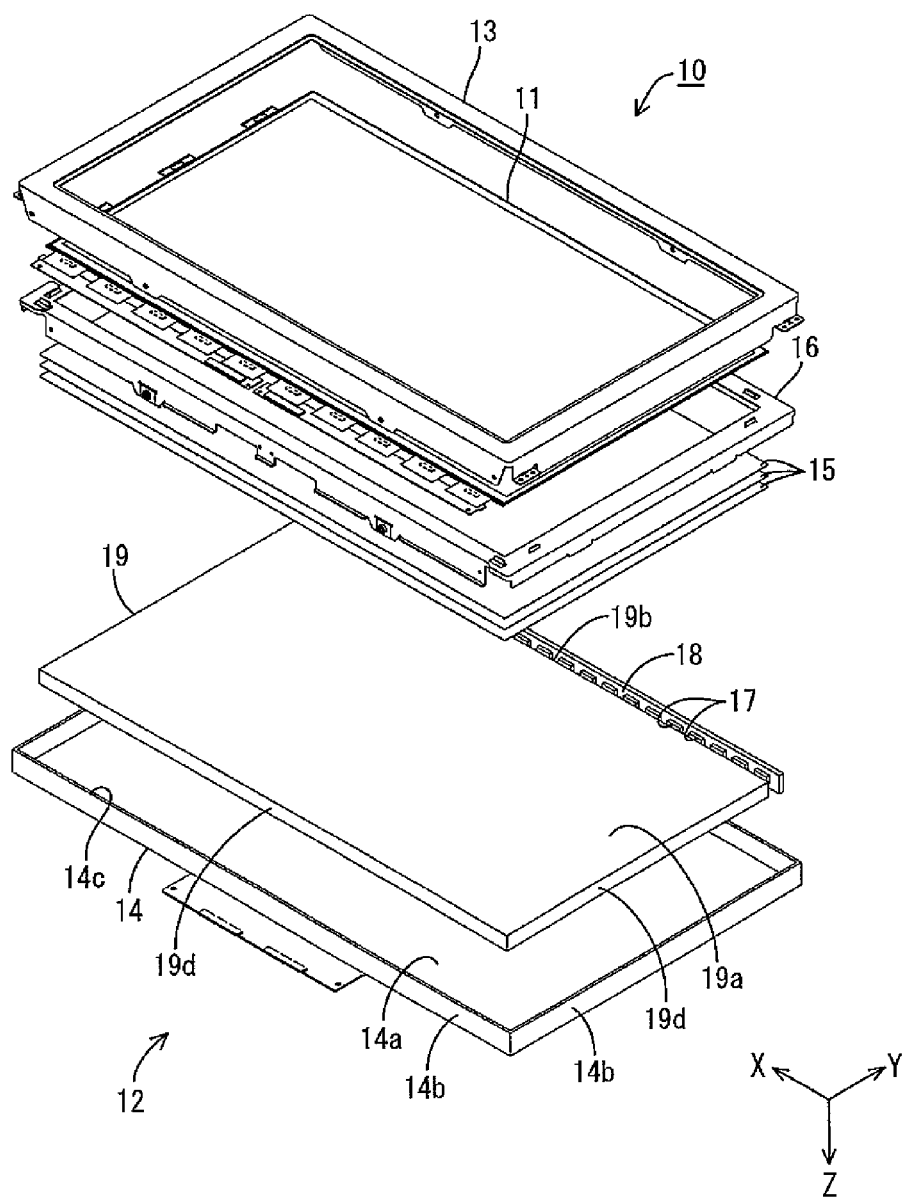
FIG. 2 is an exploded perspective view illustrating a general configuration of a liquid crystal display device included in the television device.

As illustrated in FIG. 1, a television device TV according to this embodiment includes the liquid crystal display device 10, front and rear cabinets Ca, Cb that sandwich the liquid crystal display device 10 therebetween, a power source P, a tuner T, and a stand S. The liquid crystal display device (display device) 10 has a rectangular and horizontally (longitudinally) long overall shape and is in a vertical position. As illustrated in FIG. 2, the liquid crystal display device 10 includes a liquid crystal panel 11 as a display panel and a backlight device (a lighting device) 12 as an external light source that are integrally held with a frame-like bezel 13.

Figure 7:
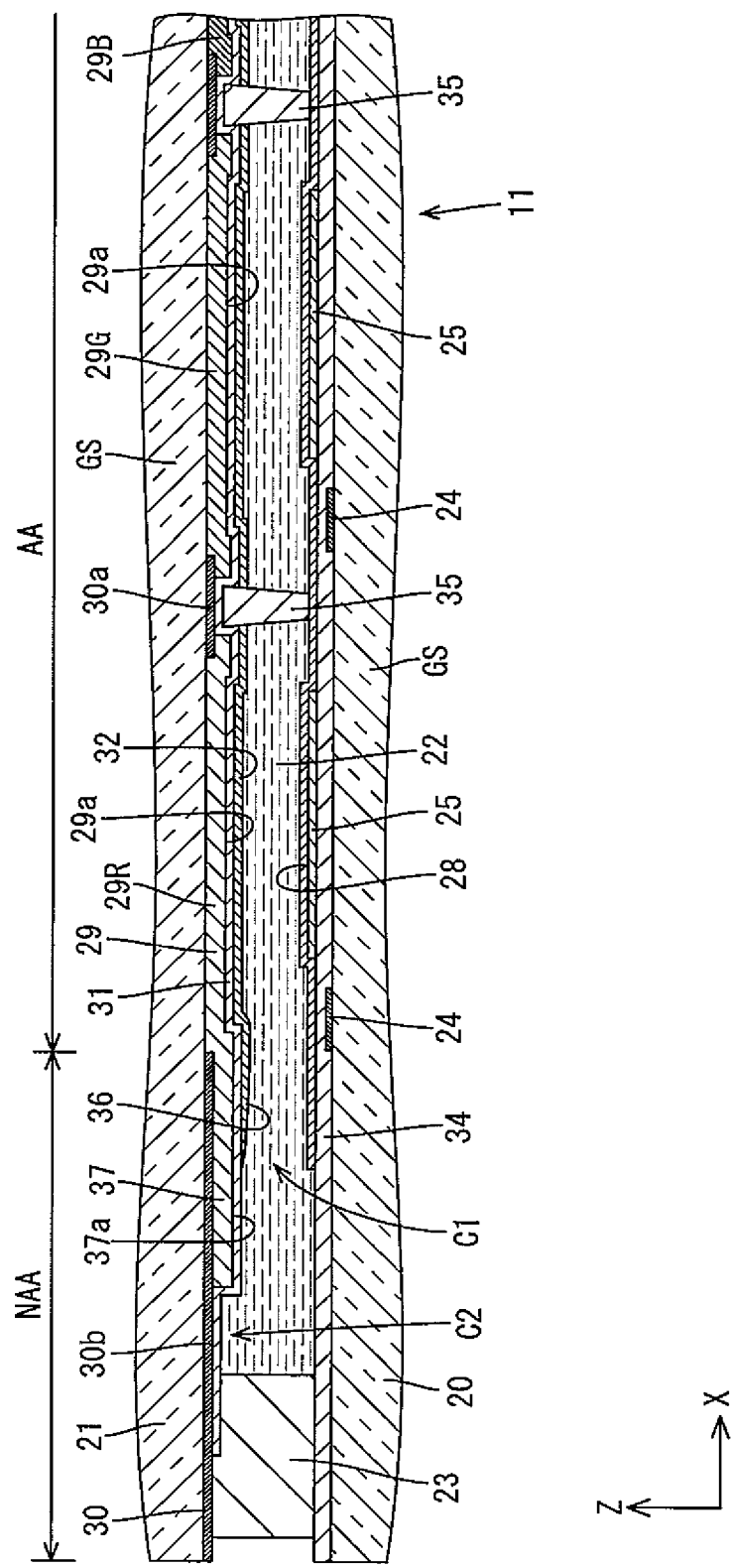
FIG. 7 is a cross-sectional view illustrating a cross-sectional configuration of an outer edge portion of the liquid crystal panel cut along a long-side (X-axis) dimension thereof.

A general configuration of the liquid crystal panel 11 will be described. As illustrated in FIG. 7, the liquid crystal panel 11 includes at least a pair of transparent glass substrates 20, 21 (having light transmissivity), liquid crystals 22 between the substrates 20 and 21, and a sealing member 23 that surrounds the liquid crystals 22 between the substrates 20 and 21 to seal the liquid crystals 22. The liquid crystals 22 contain liquid crystal materials, which are substances that change optical characteristics when electromagnetic field is applied. The substrates 20, 21 include glass substrates (base board) GS, respectively, and certain components are disposed on the top of the respective glass substrates GS. One of the substrates 20, 21 constituting the liquid crystal panel 11 on the rear (a backlight device 12 side) is an array board (a second base board, a TFT board, an active matrix board) 20. The other one of the substrates 20, 21 on the front (a light exit side) is a CF board (a display component, a counter board) 21. The liquid crystal panel 11 includes a display area (an active area) AA where images appear and that is in a middle of a screen and a non-display area (a non-active area) NAA that is at an outer peripheral edge of the screen and surrounds the display area AA. The display size of the liquid crystal panel 11 is approximately 32 inches and is generally classified as a medium sized panel. The display size of the liquid crystal panel 11 may be changed within a range from 10-odd inches to 70-odd inches if necessary. Polarizing plates (not illustrated) are arranged on outer surfaces of the respective substrates 20, 21.

Next, the backlight device 12 will be described. As illustrated in FIG. 2, the backlight device 12 includes a chassis 14 having substantially a tray shape with an opening on the front side (a light exiting side, a liquid crystal panel 11 side), an optical member 15 disposed to cover a light exiting portion 14c of the chassis 14, and a frame 16 pressing a light guide plate 19, which will be described below, from the front side. An LED board (a light source board) 18 and the light guide plate 19 are arranged within the chassis 14. Light emitting diodes (LEDs) 17 as a light source are arranged on the LED board 18 and the light guide plate 19 guides light from the LEDs 17 toward the optical member 15 (toward the liquid crystal panel 11, the light exiting side). In the backlight device 12, the LED board 18 is disposed on one of two long edges (on a far side in FIG. 2, on a right side in FIG. 3). The LEDs 17 mounted on the LED board 18 are locally disposed on one long edge side of the liquid crystal panel 11. Thus, the backlight device 12 of this embodiment is an edge light type (a side-light type), that is, in the backlight unit 12, light enters the light guide plate through one of sides of the light guide plate 19. Components of the backlight unit 12 will be described in detail below.

Figure 3:
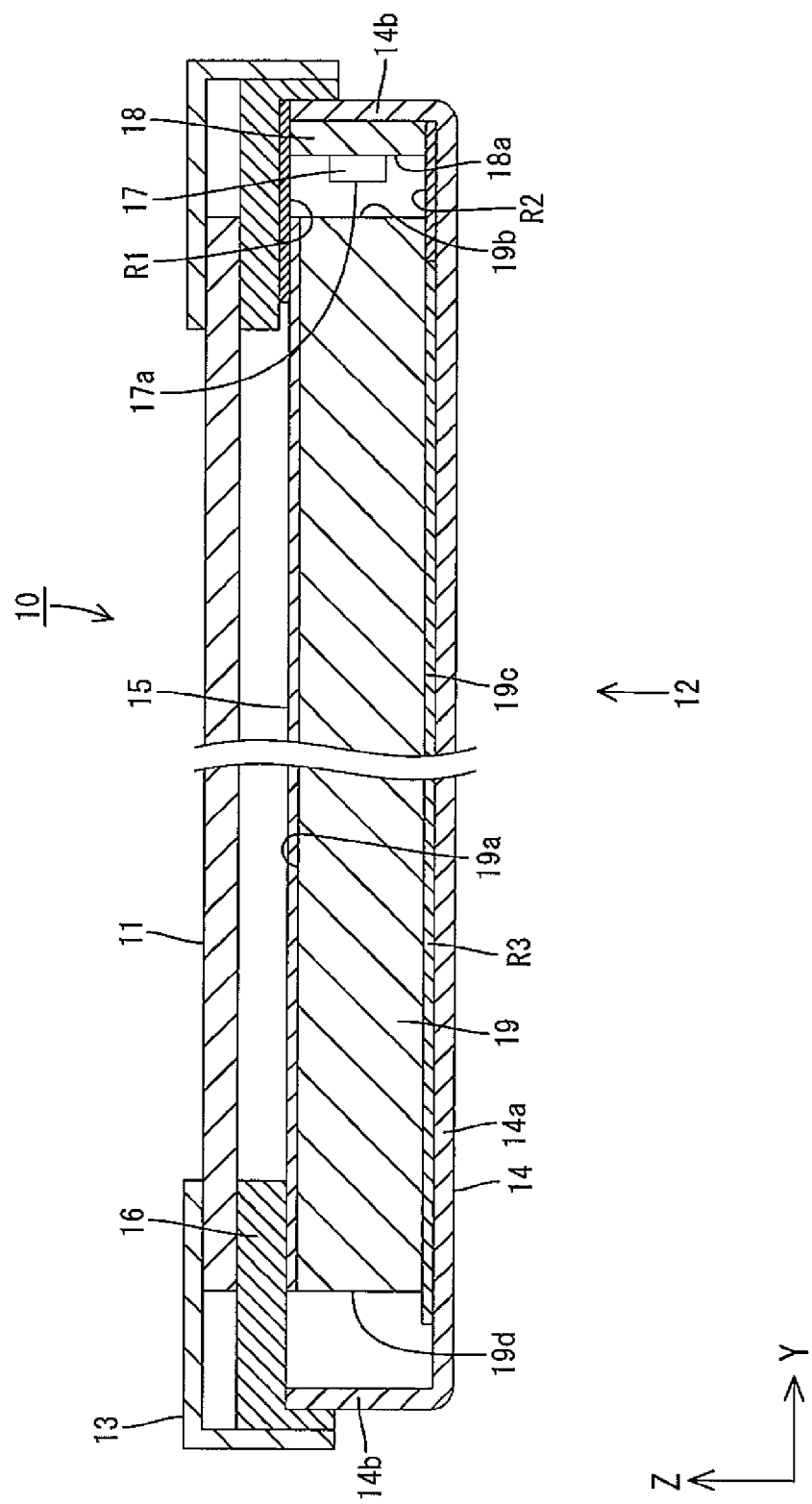
FIG. 3 is a cross-sectional view of the liquid crystal display device cut along a short-side (Y-axis) dimension thereof.

The chassis 14 is formed of a metal plate, which may be an aluminum plate. As illustrated in FIGS. 2 and 3, the chassis 14 includes a bottom plate 14a and side plates 14b. The bottom plate 14a has a horizontally-long rectangular shape similar to the liquid crystal panel 11. The side plates 14b project from corresponding outer edges of the bottom plate 14a (a pair of long edges and a pair of short edges) toward the front side. The chassis 14 (the bottom plate 14a) is oriented such that the long-side direction and the short-side direction thereof correspond with the X-axis direction and the Y-axis direction, respectively. Boards including a control board and an LED driver board (not illustrated) are mounted on the back surface of the bottom plate 14a. The frame 16 and the bezel 13 are fixable to the side plates 14b with screws.

As illustrated in FIG. 2, the optical member 15 has a horizontally-long rectangular shape in a plan view similar to the liquid crystal panel 11 and the chassis 14. The optical member 15 is placed on the front surface of the light guide plate 19 (on the light exiting side) between the liquid crystal panel 11 and the light guide plate 19. With this configuration, the optical member 15 passes light from the light guide plate 19 therethrough while adding a specific optical property to the light, and direct the light toward the liquid crystal panel 11. The optical member 15 is a multilayered member including multiple sheet-like members (three of them in this embodiment). Examples of the sheet-like members include a diffuser sheet, a lens sheet, and a reflection-type polarizing sheet. The sheet-like members may be selected from those as appropriate. In FIG. 3, the optical member 15 including three sheets is simply illustrated with a single layer for convenience.

As illustrated in FIG. 2, the frame 16 has a sash-like shape (a picture frame-like shape) which extends along outer edges of the light guide plate 19. The frame 16 can press down the outer edges of light guide plate 19 for substantially an entire perimeter from the front side. As illustrated in FIG. 3, a first reflection sheet R1 is attached to an inner surface of one of long portions of the frame 16 opposite the LED board 18 (the LEDs 17). The reflection sheet R1 is configured to reflect light. The first reflection sheet R1 has a dimension to extend for substantially an entire length of the long portion of the frame 16. The first reflection sheet R1 collectively covers the end portion of the light guide plate 19 that is opposite the LEDs 17 and the LED board 18 from the front side. The frame 16 receives the outer edges of the liquid crystal panel 11 from the rear side.

As illustrated in FIGS. 2 and 3, each LED 17 includes an LED chip mounted on a board that is fixed on the LED board 18. The LED chip is sealed with resin. The LED chip mounted on the board has one main light emission wavelength. Specifically, the LED chip emits light in a single color of blue. The resin that seals the LED chip contains phosphors dispersed therein. The phosphors emit light in a predetermined color when excited by blue light emitted from the LED chip. Overall color of light emitted from the LED 17 is white. Each LED 17 includes a light emitting surface facing the opposite direction from the LED board 18, that is, the LED 17 is a top surface emitting-type light emitting diode.

As illustrated in FIGS. 2 and 3, the LED board 18 on which multiple LEDs 17, which are described above, are mounted has a longitudinal plate-like shape that extends in the long-side direction of the chassis 14 (in the X-axis direction). The LED board 18 is attached to one of the long side plates 14b of the chassis 14. The LED board 18 is disposed such that an inner plate surface thereof is opposite an edge surface of the light guide plate 19 and the LEDs 17 are arranged on the inner plate surface of the LED board 18 along the long-side direction of the LED board 18 at substantially equal intervals. Optical axes of the LEDs 17 mounted on the LED board 18 substantially correspond with the Y-axis direction (a direction parallel to the plate surface of the liquid crystal panel 11).

The light guide plate 19 is made of synthetic resin (e.g., acrylic) having a refractive index sufficiently higher than that of the air and substantially transparent (having high light transmissivity). As illustrated in FIGS. 2 and 3, the light guide plate 19 has a horizontally-long rectangular plate-like shape in a plan view similar to the liquid crystal panel 11 and the bottom plate 14a of the chassis 14. The light guide plate 19 has a plate surface facing the front side that is a light exit surface 19a. The light exit surface 19a is a surface through which the rays of light from the inside of the light guide plate 19 toward the optical member 15 and the liquid crystal panel 11. The light guide plate 19 includes edge surfaces that are adjacent to the plate surface. The edge surfaces include a pair of long edge surfaces along the X-axis direction. One of the long edge surfaces (that is on the farther side in FIG. 2, on the right in FIG. 3) is opposite the LEDs 17 (the LED board 18) with a predetermined gap therebetween and is defined as a light entrance surface 19b through which light from the LEDs 17 enter. The light guide plate 19 receives rays of light that is emitted by the LEDs 17 along the Y-axis direction through the light entrance surface 19b. The light travels within the light guide plate 19 and is directed toward the optical member 15 (toward the front side, toward the light exiting side) and exits through the light exit surface 19a. At a front side of a space between the LEDs 17 and the light entrance surface 19b, the first reflection sheet R1, which is described earlier, is disposed. At a rear side of the space, a second reflection sheet R2 is disposed such that the space is between the first reflection sheet R1 and the second reflection sheet R2. Further to the space, the edge of the light guide plate 19 on the LED 17 side and the LEDs 17 are also between the reflection sheets R1, R2. With the configuration, the rays of light from the LEDs 17 are repeatedly reflected between the reflection sheets R1, R2 and thus the rays of light efficiently enter the light entrance surface 19b.

As illustrated in FIG. 3, a third reflection sheet R3 is disposed on the plate surface 19c of the light guide plate 19 on a side opposite from the light exit surface 19a so as to cover a substantially entire area of the opposite plate surface 19c. Namely, the third reflection sheet R3 is disposed between the bottom plate 14a of the chassis 14 and the light guide plate 19. On the opposite plate surface 19c of the light guide plate 19, a light reflection pattern (not illustrated) is formed. The light reflection pattern is formed of a light reflecting portion for reflecting light traveling within the light guide plate 19 toward the light exit surface 19a and exiting the light through the light exit surface 19a.

Figure 4:
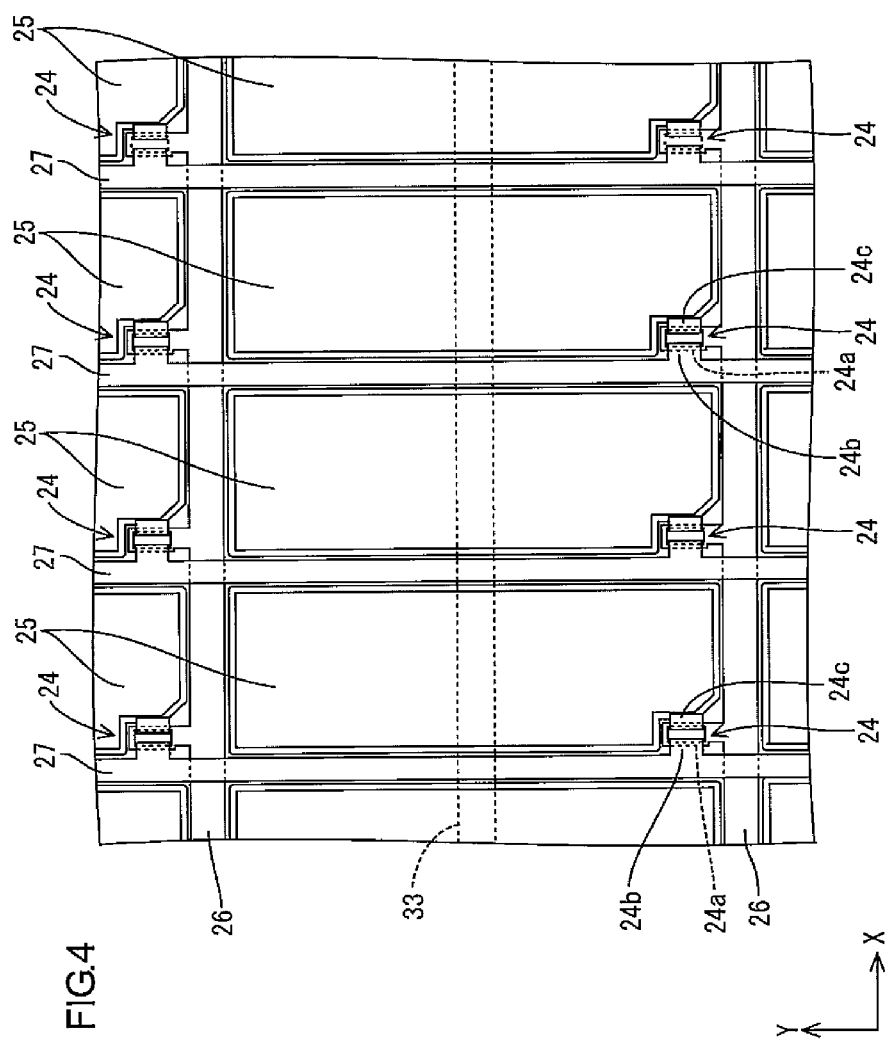
FIG. 4 is an enlarged plan view illustrating a planar configuration of an array board.

Next, the substrates 20 and 21 will be described in detail. First, the array board 20 will be described. As illustrated in FIG. 4, on the inner surface of the array board 20 (on the liquid crystals 22 side, opposite to the CF board 21) in the display area AA, a number of thin film transistors (TFTs) 24 and a number of pixel electrodes 25 are arranged in a matrix along a plate surface of the array board 20. The TFTs 24 are switching components and each of the TFTs 24 includes three electrodes 24a to 24c. Furthermore, gate lines 26 and source lines 27 are arranged around the TFTs 24 and the pixel electrodes 25 so as to form a grid. The gate lines 26 and the source lines 27 are made of metal, and an insulation film, which is not illustrated, is interposed between portions of the gate lines 26 and the source lines 27 that cross each other. The gate lines 26 and the source lines 27 are connected to gate electrodes 24a and source electrodes 24b of the respective TFTs 24. As illustrated in FIG. 7, an insulation film (an organic insulation film) 34 is interposed between the TFTs 24 and the pixel electrodes 25. The insulation film 34 is made of resin material that is substantially transparent and has an insulation property. The insulation film 34 is disposed over a substantially entire area of the array board 20. Each pixel electrode 25 is a transparent electrode film made of indium tin oxide (ITO), for example, and has a plan view vertically rectangular shape in an area surrounded by the gate lines 26 and the source lines 27. Each pixel electrode 25 is connected to a drain electrode 24c of the TFT 24 by a drain line (not illustrated) via a contact hole (not illustrated) that is partially formed in the insulation film 34. An array board side alignment film 28 is disposed on surfaces of the insulation film 34 and the pixel electrodes 25 to face the liquid crystals 22. The liquid crystal molecules contained in the liquid crystals 22 are aligned by the array board side alignment film 28. The array board side alignment film 28 is made of polyimide, for example, and is formed over the display area AA and the non-display area NAA of the array board 20. Specifically, the array board side alignment film 28 is disposed on an entire area of the display area AA and an inner peripheral portion of the non-display area NAA (a portion of the non-display area NAA that is next to the display area AA). The array board side alignment film 28 is a photo-alignment film that aligns the liquid crystal molecules along an irradiation direction of light upon irradiation of the light having a specific wave length region (such as ultraviolet rays). FIG. 7 illustrates an outer edge portion of the liquid crystal panel 11 cut along an area ranging from the display area AA to the non-display area NAA. In FIG. 7, the TFTs 24 are simply illustrated and the source lines 27 are not illustrated.

As illustrated in FIG. 4, the array board 20 includes capacitive lines (auxiliary capacitive lines, storage capacitive lines, Cs lines) 33. The capacitive lines 30 are arranged parallel to the gate lines 26 and overlap the pixel electrodes 25 in a plan view. The capacitive lines 33 are disposed alternately with the gate lines 26 with respect to the Y-axis direction. Each gate line 26 is disposed between the adjacent pixel electrodes 25 with respect to the Y-axis direction. Each of the capacitive lines 33 is disposed so as to cross the corresponding pixel electrodes 25 at about the middle of the Y-axis dimension of each of the corresponding pixel electrodes 25. Terminals that continue from the gate lines 26 and terminals that continue from the capacitive lines 33 and terminals that continue from the source lines 27 are disposed in an edge portion of the array board 20. Signals or reference potentials are input from a control board, which is not illustrated, to the terminals. With the configuration, driving of the TFTs 24 arranged in a matrix is individually controlled.

Figure 5:
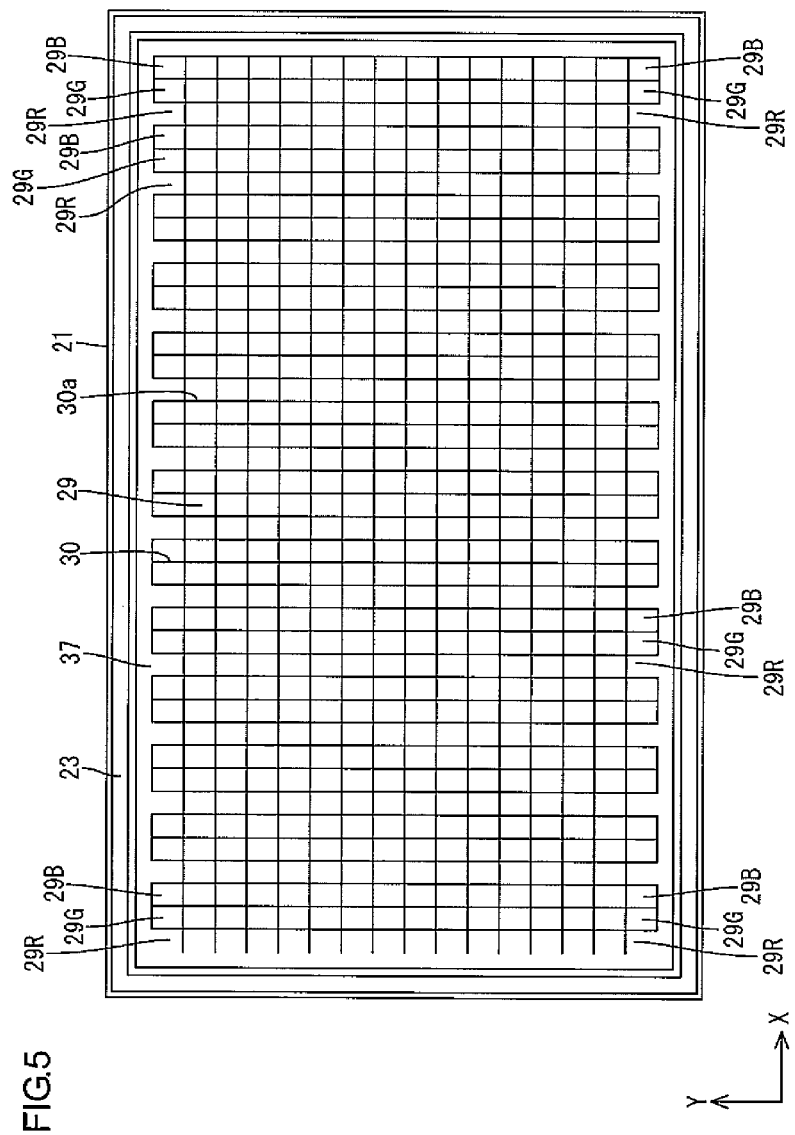
FIG. 5 is a plan view illustrating a planar configuration of a CF board.
Figure 6:
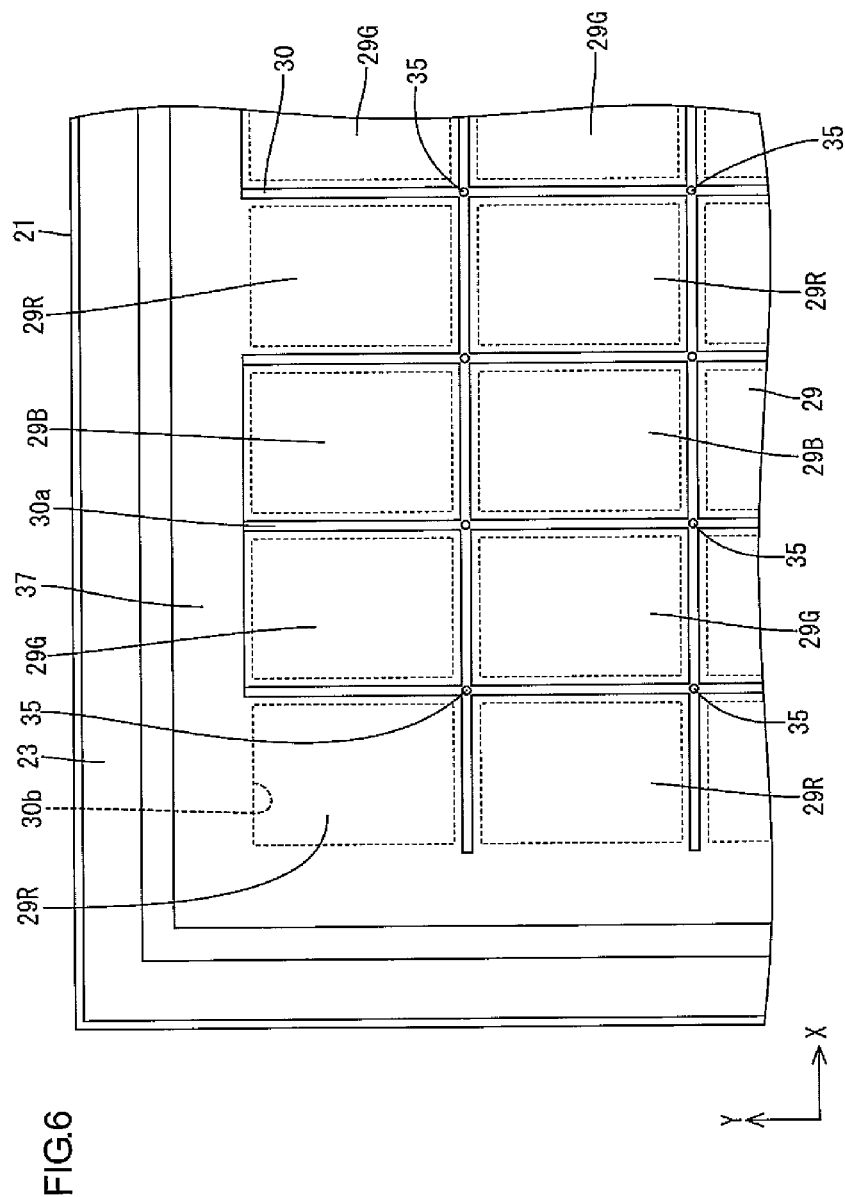
FIG. 6 is a plan view illustrating a planar configuration of a corner portion of the CF board.
Figure 9:
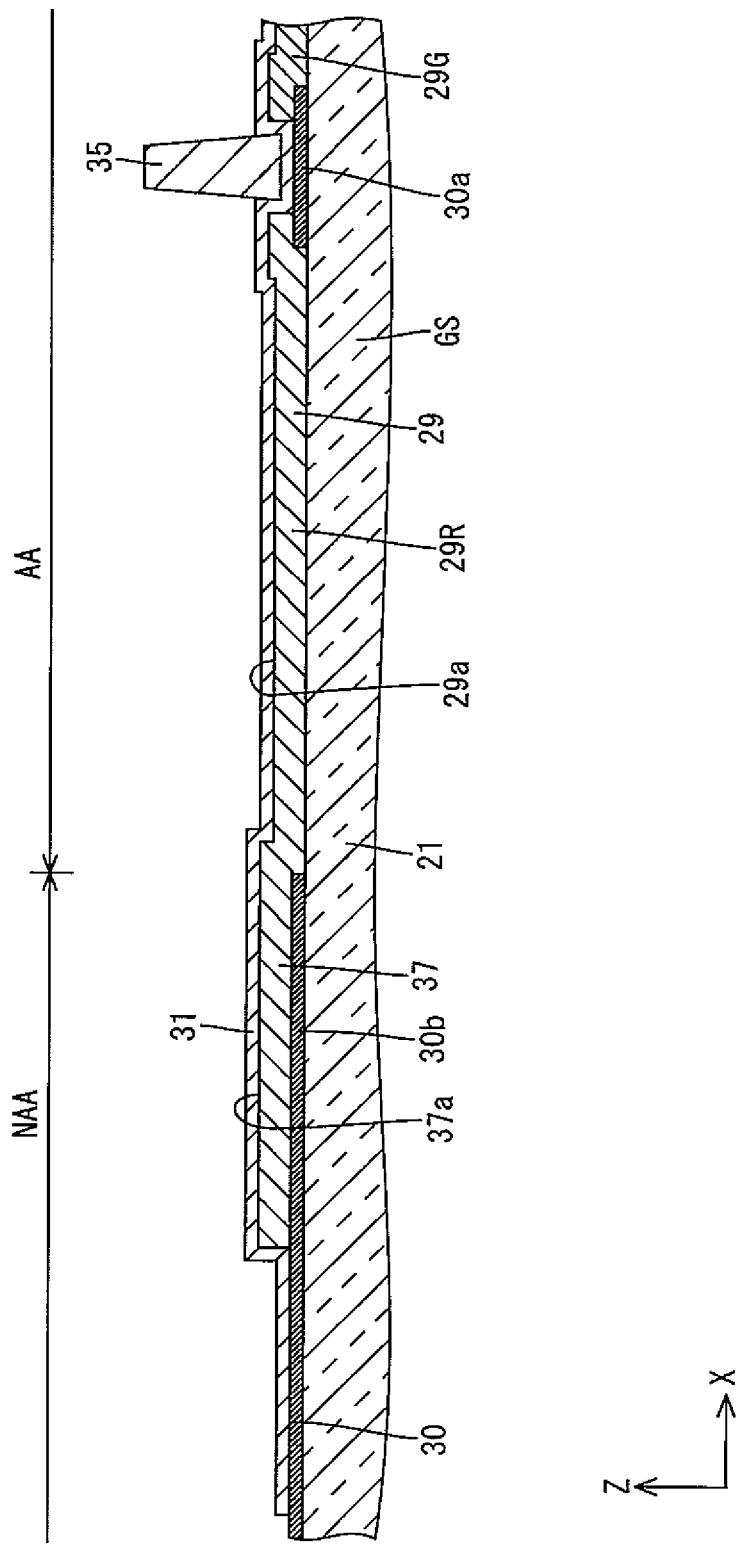
FIG. 9 is a cross-sectional view of the CF board where a counter electrode is formed and an alignment film is not formed in a manufacturing process of the CF board.

Next, the CF board 21 will be described. As illustrated in FIGS. 5 and 6, on the inner surface of the CF board 21 (on the liquid crystals 22 side, opposite to the array board 20), color filters 29 and light blocking portions (a black matrix) 30 are arranged along a plate surface of the CF board 21. The color filters 29 are disposed on a relatively upper-layer side and the light blocking portions 30 are disposed on a relatively lower-layer side (FIG. 7). The color filters 29 are made of photosensitive resin containing pigments for coloring and formed on the CF board 21 with patterning by a known photolithography method in a manufacturing process. The color filters 29 include color portions 29R, 29G, 29B that are arranged in a plane in columns and rows (in a matrix) to overlap the respective pixel electrodes 25 on the array board 20 side in the display area AA of the CF board 21. Each of the color portions 29R, 29G, 29B has a vertically rectangular outer shape in a plan view like the pixel electrode 25 and constitutes a pixel (a unit pixel) with an opposed pixel electrode 25. The color filters 29 include the color portions 29R, 29G, 29B that represent red, green, and blue. The color portions 29R, 29G, 29B are arranged in repeated sequence along the row direction (the X-axis direction) to form a group of the color portions. The groups of the color potions 29R, 29G, 29B are arranged along the column direction (the Y-axis direction). According to such a configuration, the color portions 29R, 29G, 29B that are adjacent to each other in the X-axis direction represent different colors and the color portions 29R, 29G, 29B that are adjacent to each other in the Y-axis direction represent a same color. The red color portion 29R is arranged on a left edge side in the display area AA of the CF board 21 in FIGS. 5 and 6, the green color portion 29G is arranged on the right side of the red color portion 29R, and the blue color portion 29B is arranged on the right side of the green color portion 29G. The blue color portion 29B is arranged on a right edge side in FIGS. 5 and 6, the green color portion 29G is arranged on the left side of the blue color portion 29B, and the red color portion 29R is arranged on the left side of the green color portion 29G. The color portions 29R, 29G, 29B in the color filters 29 selectively pass light having specific wavelengths therethrough. As illustrated in FIG. 9, each red color portion 29R that represents red selectively passes light in a red wavelength region (about 600 nm to 780 nm), that is, red light therethrough. Each green portion 29G that represents green selectively passes light in a green wavelength region (about 500 nm to 570 nm), that is, green light therethrough. Each blue portion 29B that represents blue selectively passes light in a blue wavelength region (about 420 nm to 500 nm), that is, blue light therethrough.

The light blocking portions 30 are made of photosensitive resin containing a light blocking material (such as carbon black) and have a high light blocking property. The light blocking portions 30 are formed on the CF board 21 with patterning by the known photolithography method in a manufacturing process. The light blocking portions 30 have a thickness smaller than the film thickness of each color portion 29R, 29G, 29B included in the color filter 29 (FIG. 7). As illustrated in FIGS. 5 and 6, the light blocking portions 30 include light blocking portions between pixels (a grid light blocking portion) 30a and a frame-shaped light blocking portion 30b. The light blocking portions between pixels 30a are disposed in the display area AA of the CF board 21 to define each of the adjacent color portions 29R, 29G, 29B and prevent mixture of the colors of the pixels. The frame-shaped light blocking portion 30b is disposed in the non-display area NAA of the CF board 21. Among them, the light blocking portions between pixels 30a are formed in a grid to overlap the gate lines 26 and the source lines 27 on the array board 20 side in a plan view. Namely, the light blocking portions between pixels 30a include multiple frame-shaped portions each of which surrounds each color portion 29R, 29G, 29B of the color filter 29 separately. The multiple frame-shaped portions are arranged in a continuous manner along the X-axis direction and the Y-axis direction. The light blocking portions between pixels 30a are arranged such that an inner peripheral edge portion of each light blocking portion between pixels 30a overlaps an outer peripheral edge portion of each color portion 29R, 29G, 29B. An overlapping portion of the light blocking portion between pixels 30a is on a lower-layer side and an overlapping portion of each color portion 29R, 29G, 29B is on an upper-layer side. The overlapping portion (an upper overlapping portion) of each color portion 29R, 29G, 29B is thinner than a non-overlapping portion of each color portion that does not overlap the light blocking portions between pixels 30a. The frame-shaped light blocking portion 30b is formed over an entire area of the non-display area NAA of the CF board 21 and formed in a frame shape (an endless loop) surrounding an entire periphery of the light blocking portions between pixels 30a in a plan view.

As illustrated in FIG. 7, a counter electrode 31 is disposed on surfaces of the color filter 29 and the light blocking portion 30 on the CF board to be opposite the pixel electrodes 25 on the array board 20. The counter electrode 31 is a transparent conductive film made of indium tin oxide (ITO). The counter electrode 31 is disposed over an entire area of the display area AA of the CF board 21 as well as a part of the non-display area (close to the display area AA) to cover an entire area of the color filter 29 and a part of the light blocking portion 30 (excluding an outer peripheral portion of the frame-shaped light blocking portion 30b). The counter electrode 31 is supplied with a constant reference potential (a common potential), for example. Therefore, each of the pixel electrodes 25 is supplied with a predetermined potential via a corresponding TFT 24 to generate predetermined potential difference between the electrodes 25 and 31. According to the potential difference generated between the electrodes 25 and 31, the alignment of the liquid crystal molecules is controlled by an electric field acting on the liquid crystals 22 and the amount of light transmitting through the liquid crystal panel 11 is controlled independently for each pixel. Accordingly, color images are displayed in the display area AA of the liquid crystal panel 11 with appropriate gradation. In FIGS. 5 and 6, the counter electrode 31 is not illustrated.

As illustrated in FIG. 7, the counter electrode 31 includes post spacers (a photo spacer) 35 on a surface thereof in the display area AA of the CF board 21. The post spacers 35 keep a cell gap between the boards 20 and 21 constant. The post spacers 35 are made of substantially transparent photosensitive resin and are formed on the CF board 21 with patterning by the known photolithography method in the process of manufacturing the CF board 21. Each of the post spacers 35 has a tapered columnar shape projecting from the surface of the counter electrode 31 on the CF board 21 toward the array board 20 so that a distal end portion is in contact with an inner surface of the array board 20 (a surface of the array board side alignment film 28). Accordingly, a distance between the array board 20 and the CF board 21 that are opposed to each other, that is a cell gap, is maintained constant. As illustrated in FIG. 6, the post spacers 35 are arranged to overlap the light blocking portions between pixels 30a of the light blocking portion 30 in a plan view. Specifically, the post spacer 35 overlaps each corner of the frame portion of the light blocking portion between pixels 30 in a plan view, the frame portion surrounding each color portion 29R, 29G, 29B. The cell gap between the boards 20 and 21 is maintained by a sealing member 23 surrounding the liquid crystals 22. The sealing member 23 is disposed near the outer peripheral edge portion of the non-display area NAA to overlap the insulation film 34 on the array board 20, the outer peripheral portion of the frame-shaped light blocking portion 30b on the CF board 21, and the outer peripheral edge portion of the counter electrode 31. The sealing member 23 is illustrated in FIGS. 5 and 6 to describe planar positional relation of the sealing member 23 and the color filter 29 and the light blocking portion 30, although FIGS. 5 and 6 illustrate a plan view of the CF board 21.

As illustrated in FIG. 7, a CF board side alignment film (an alignment film) 32 is disposed on a surface of the counter electrode 31 to face the liquid crystals 22 to align liquid crystal molecules contained in the liquid crystals 22. The CF board side alignment film 32 is made of polyimide, for example, and disposed over an area ranging from the display area AA to the non-display area NAA of the CF board 21. Specifically, the CF board side alignment film 32 is disposed over an entire area of the display area AA and the inner peripheral portion of the non-display area NAA (a portion next to the display area AA). The CF board side alignment film 32 is a photo alignment film that aligns the liquid crystal molecules along an irradiation direction of light by irradiation of the light having a specific wavelength (for example, ultraviolet rays). In FIGS. 5 and 6, the CF board side alignment film 32 is not illustrated.

As illustrated in FIG. 7, the color filter 29 having a relatively great film thickness is disposed in the display area AA of the CF board 21, and the frame-shaped light blocking portion 30b having a relatively small film thickness is disposed in the non-display area NAA. Therefore, level difference is caused between surfaces of the color filter 29 and the frame-shaped light blocking portion 30b. In forming the CF board side alignment film 32, a material that is in a liquid state is supplied to the display area AA of the CF board 21 by an ink jet device, which is not illustrated, so that the supplied material flows and spreads over the CF board 21 to form the film. In the forming of the CF board side alignment film 32, due to the above described level difference, the CF board side alignment film 32 is likely to have a thickness variation portion 36 at the outer peripheral edge portion of the CF board side alignment film 32. The thickness variation portion 36 gradually decreases the thickness thereof toward an outer side. The thickness variation portion 36 has a surface that is sloped downward from a middle toward the outer edge portion of the CF board side alignment film 32 (sloped upward from the outer edge portion toward the middle). The CF board side alignment film 32 may include the thickness variation portion 36 in a part or an entire area of the outer edge portion thereof. The material for the CF board side alignment film 32 has wavelength dependency in light absorbing properties and absorbs a greater amount of light having a specific wavelength region than light having another wavelength region. Therefore, the absorbing amount of light having the above specific wavelength region in the thickness variation portion 36 is different from that in the portion having a constant film thickness (a thickness constant portion). Accordingly, a shade of color of transmission light in the thickness variation portion 36 is different from that in the portion having the constant film thickness. If the film thickness variation portion 36 is in the display area AA, color unevenness may be caused in the display image and the display quality may be remarkably deteriorated. The surfaces of the display area AA and the non-display area NAA are less likely to have level difference, since the array board 20 includes the insulation film 34 that functions as a flattening film. Therefore, the above-described thickness variation portion 36 is less likely to be formed in the array board side alignment film 28. Even if the thickness variation portion 36 is formed, the variation amount of the film thickness is quite small and color unevenness is less likely to be caused.

As illustrated in FIGS. 5 to 7, the CF board 21 of this embodiment has a film forming control portion 37 that is disposed in the non-display area NAA next to the display area AA and overlaps the surface of the CF board 21 (projects from the surface of the CF board 21). Before the CF board side alignment film 32 is disposed, the film forming control portion 37 reduces the level difference between a surface of the portion of the non-display area NAA of the CF board 21 next to the display area AA and a surface of the portion of the display area AA next to the non-display area NAA (a portion of the color filter 29 that is on an outer edge of the display area AA). The CF board side alignment film 32 is formed in the non-display area NAA without forming the thickness variation portion 36 in the display area AA. Accordingly, the film thickness of the CF board side alignment film 32 in the display area AA is uniform, and the color unevenness is less likely to be caused in the transmission light transmitting through the CF board side alignment film 32 in the display area AA. Thus, the color unevenness is less likely to be caused in display images and the display quality is improved. The film forming control portion 37 will be described in detail.

Figure 8:
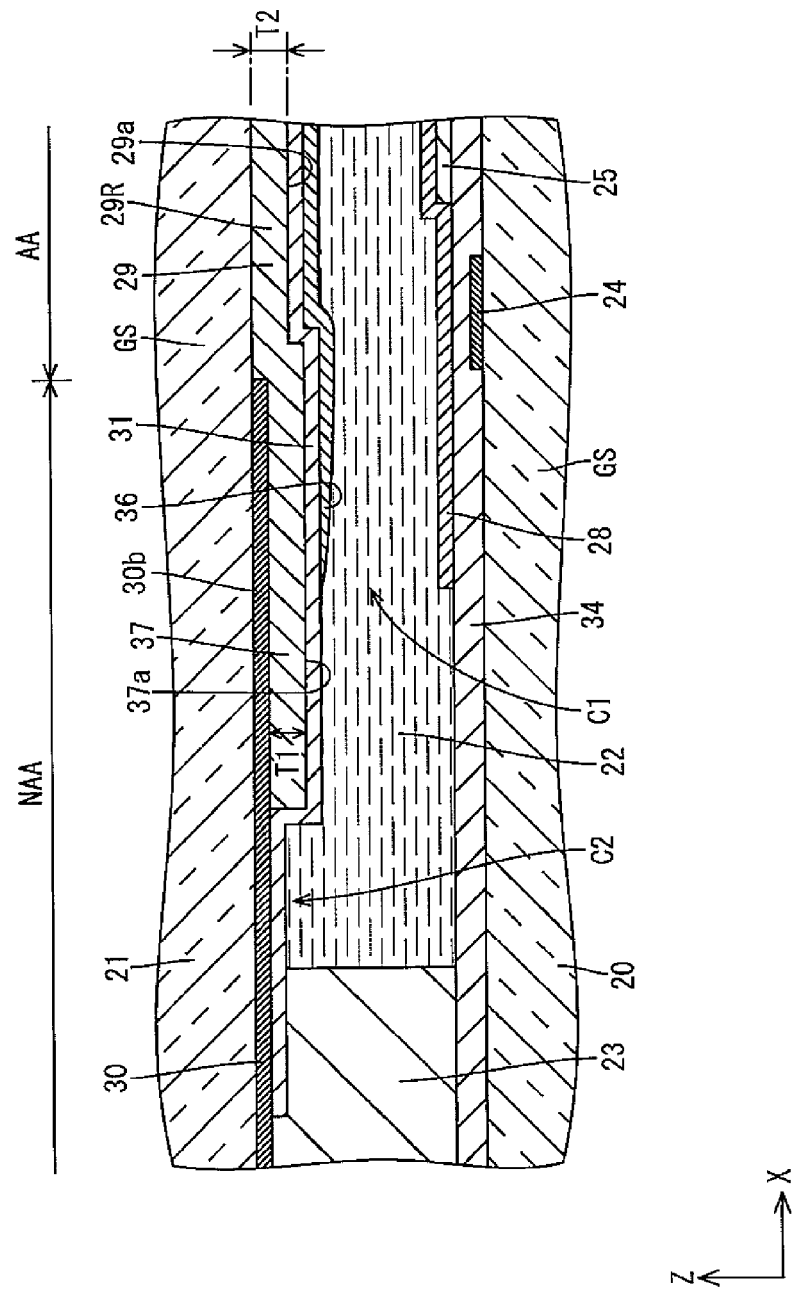
FIG. 8 is an enlarged cross-sectional view of FIG. 7.

As illustrated in FIGS. 5 to 7, the film forming control portion 37 is disposed in the inner peripheral portion of the non-display area NAA of the CF board 21 and is between the display area AA and the sealing member 23 that is disposed in the outer peripheral portion of the non-display area. More in detail, the film forming control portion 37 is disposed in the inner peripheral edge portion of the non-display area of the CF board 21 (close to the outer periphery of the display area AA) and overlaps the surface of the frame-shaped light blocking portion 30b (in a plan view). The film forming control portion 37 has a frame-like shape (an endless loop shape) surrounding an entire periphery of the display area AA (the light blocking portions between pixels 30a and the color filter 29) following the planar shape of the frame-shaped light blocking portion 30b. The film forming control portion 37 having such a frame-like shape controls forming of the CF board side alignment film 32. Therefore, the thickness variation portion 36 that is formed at the outer edge portion of the CF board side alignment film 32 is highly reliably formed in the non-display area NAA. Accordingly, the thickness variation portion 36 is reliably less likely to be formed in the display area AA. Further, as illustrated in FIG. 8, the film forming control portion 37 is formed such that the surface 37a thereof is above the surface 29a of each color portion 29R, 29G, 29B (is close to the array board 20 in the Z-axis direction). Accordingly, the film forming control portion 37 functions as a weir against a liquid material in forming the CF board side alignment film 32. Therefore, the material of the amount that is sufficient to go over the film forming control portion 37 is supplied so that the film thickness of the CF board side alignment film 32 is easily made uniform in the display area AA that is surrounded by the film forming control portion 37.

As illustrated in FIGS. 5 to 7, the film forming control portion 37 is made of the same material as the color filter 29. Specifically, the film forming control portion 37 is made of the same material as the red color portion 29R among the color portions 29R, 29G, 29B of the color filter 29 and is formed with patterning at the same time (in the same process) of forming the red color portion 29R with patterning by the photolithography method. As illustrated in FIG. 8, the film forming control portion 37 has a thickness T1 that is equal to a thickness T2 of the red color portion 29R. Accordingly, a photo mask used in forming the red color portion 29R and the film forming control portion 37 with patterning by the photolithography method has the same configuration of a light transmission portion (a light blocking portion) for forming the red color portion 29R with patterning and a light blocking portion (a light blocking portion) for forming the film forming control portion 37 with patterning. Namely, it is not necessary to use a photo mask having a complicated configuration such as a half-tone mask or a gray-tone mask and therefore, a cost for the photo mask is reduced and an exposure error is less likely to be caused and the film forming control portion 37 is easily formed. Further, the film forming control portion 37 is formed continuous from one of the color portions 29R, 29G, 29B of the color filter 29 that is at the edge of the display area AA. Accordingly, any step or gap is less likely to be generated between the film forming control portion 37 and one of the color portions 29R, 29G, 29B that is at the edge of the display area AA. The cross-sectional shape of the CF board side alignment film 32 to be formed is less likely to be complicated and the film thickness of the CF board side alignment film 32 is reliably to be uniform. Specifically, the color portions 29R, 29G, 29B that may be at the edge of the display area AA include the red color portion 29R and therefore, the film forming control portion 37 is continuous from the red color portion 29R that is at the edge of the display area AA without having an interface therebetween. On the other hand, the film forming control portion 37 is continuous from the green color portion 29G and the blue color portion 29B that are at the edge of the display area AA with having interfaces therebetween. As described before, the film forming control portion 37 is made of the same material as the color filter 29 and an entire surface of the film forming control portion 37 is covered with the counter electrode 31.

As illustrated in FIG. 8, the film forming control portion 37 is closer to the display area AA than the sealing member 23 in the non-display area NAA of the CF board 21 and is spaced from the array board 20 with a clearance C. Specifically, the thickness T1 of the film forming control portion 37 is sufficiently smaller than the distance between the CF board 21 and the array board 20, and a total dimension of the thickness T1 of the film forming control portion 37 plus all the thicknesses of the light blocking portion 30, the counter electrode 31, and the CF board side alignment film 32 is smaller than the distance between the CF board 21 and the array board 20. Namely, the counter electrode 31 and the CF board side alignment film 32 that are layered on the film forming control portion 37 are spaced from the components (the insulation film 34 and the array board side alignment film 28) that are on the array board 20 side with a clearance C1, and the liquid crystal material, which is the liquid crystals 22, is freely movable between the display area AA and the non-display area NAA through the clearance C1. Therefore, when the substrates 20 and 21 are bonded together in manufacturing the liquid crystal panel 11, the liquid crystals 22 dropped in the display area AA may flow from the display area AA toward the non-display area NAA and easily reach the sealing portion 23. Accordingly, air is less likely to stay in a space surrounded by the sealing member 23 and the substrates 20 and 21 and bubbles are less likely to be generated in the liquid crystals 22 and the display quality of display images is less likely to be deteriorated.

As illustrated in FIG. 8, the film forming control portion 37 is disposed close to the display area AA in the non-display area NAA of the CF board 21 with having a clearance C2 from the sealing member 23. The film forming control portion 37 is disposed close to the display area AA and spaced from the sealing member 23 with the clearance C2. Therefore, even if the material for the CF board side alignment film 32 goes over the film forming control portion 37 in the non-display area NAA and spreads toward the sealing member 23 in forming the CF board side alignment film 32, the material is less likely to reach the sealing member 23. Namely, the clearance C2 between the sealing member 23 and the film forming control portion 37 functions as a spatial buffer against the material flowing from the display area AA side toward the non-display area NAA in forming the CF board side alignment film 32. Accordingly, the CF board side alignment film 32 is less likely to overlap the sealing member 23 and the sealing property of the sealing member 23 is less likely to be adversely affected.

The liquid crystal panel 11 has such configurations and a method of manufacturing the liquid crystal panel 11 will be described. The liquid crystal panel 11 according to this embodiment is manufactured via an array board manufacturing process for manufacturing the array board 20, a CF board manufacturing process for manufacturing the CF board 21, and a bonding process for bonding the array board 20 and the CF board 21. In this embodiment, the array board manufacturing process is not described and the CF board manufacturing process and the bonding process will be described in detail.

The CF board manufacturing process will be described. In the CF board manufacturing process, the light blocking portion 30 is formed on the glass substrate GS constituting the CF board 21 with patterning by the photolithography method and then, the color filter 29 and the film forming control portion 37 are formed with patterning by the photolithography method. The color filter 29 includes the red color portions 29R, the green color portions 29G, and the blue color portions 29B that are appropriately formed in a predetermined sequence. The film forming control portion 37 is formed at the same time of forming the red color portions 29R. Then, the counter electrode 31, which is a solid pattern, is formed, and the post spacers 35 are formed with patterning by the photolithography method as illustrated in FIG. 9. Then, the CF board side alignment film 32 is formed by using an ink jet device, which is not illustrated.

Figure 10:
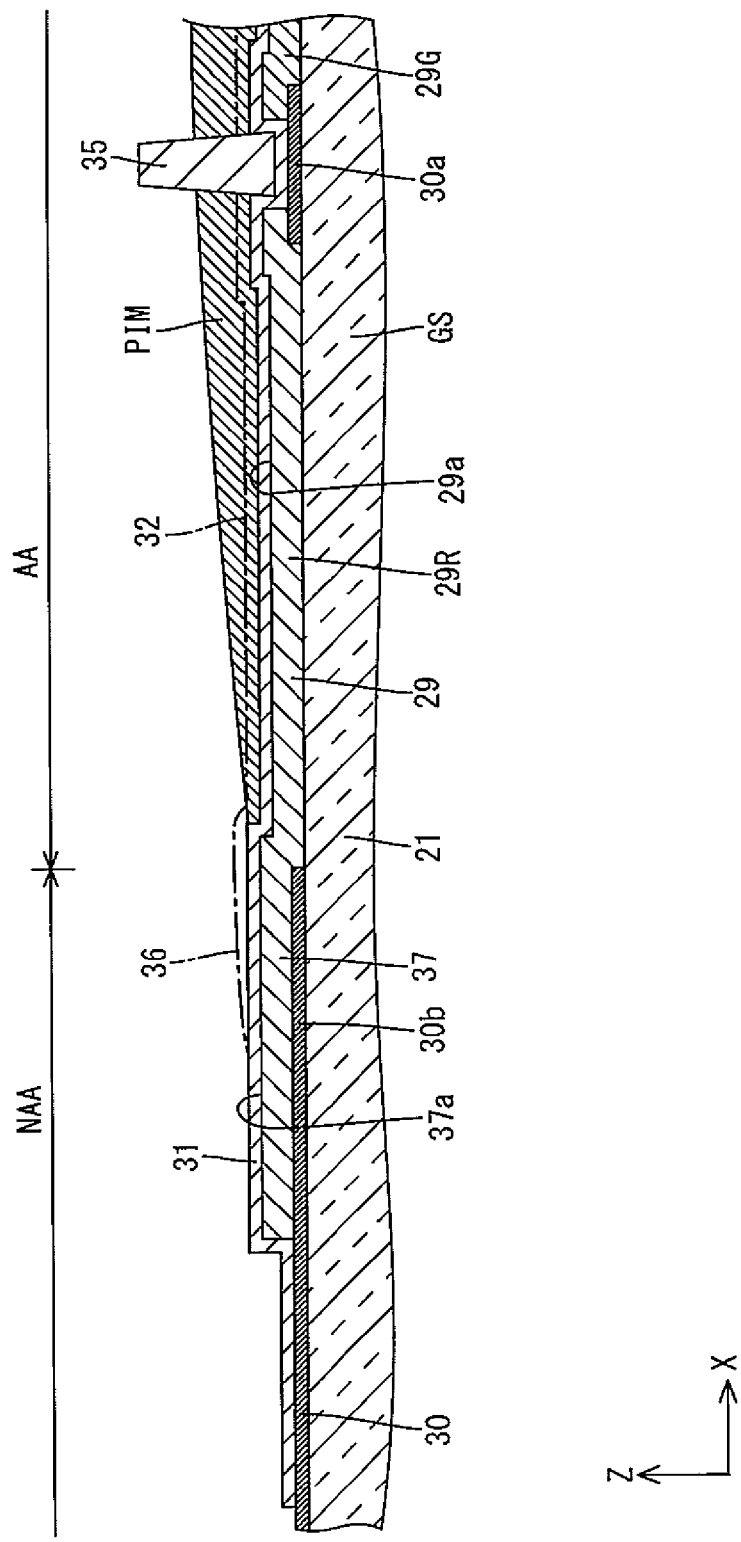
FIG. 10 is a cross-sectional view of the CF board in which a material for the alignment film is supplied in the display area in the manufacturing process of the CF board.

In forming the CF board side alignment film 32, droplets PIM, which are a material for the CF board side alignment film 32, are ejected through nozzles of the ink jet device onto the glass substrate GS, which constitutes the CF board 21, and impacted on the display area AA of the glass substrate GS. As illustrated in FIG. 10, the droplets PIM impacted on the display area AA of the glass substrate GS, which constitutes the CF board 21, spread over the surface of the counter electrode 31 from the respective impacted positions so that the adjacent droplets PIM spread to be connected to each other. Accordingly, the CF board side alignment film 32 is formed. While the droplet PIM impacted on the outermost edge of the display area AA spreads toward the non-display area NAA, the droplet PIM goes on the film forming control portion 37 whose surface 27a is at a height greater than a height of the surface 19a of the color filter 29. The droplet stays within the display area AA until going on the film forming control portion 37 and therefore, the film thickness of the CF board side alignment film 32 is easy to be uniform within the display area AA. The amount of the material (the droplet) of the CF board side alignment film 32 supplied to the display area AA is effective to be set such that the material goes on the film forming control portion 37 and spreads to the non-display area NAA in view of improving uniformity of the film thickness of the CF board side alignment film 32 in the display area AA. Further, the film forming control portion 37 that surrounds the entire periphery of the display area AA functions as a weir against the droplet PIM for forming the CF board side alignment film 32 and is effective for forming the CF board side alignment film having the uniform thickness in the display area AA. Even if the droplet for forming the CF board side alignment film 32 that is on the film forming control portion 37 is solidified and formed as the thickness variation portion 36, the thickness variation portion 36 is not disposed in the display area AA but in the non-display area NAA. Therefore, color unevenness caused by the thickness variation portion 36 is less likely to be caused in the display area AA. Accordingly, the display quality of images appearing in the display area AA is improved.

Figure 11:
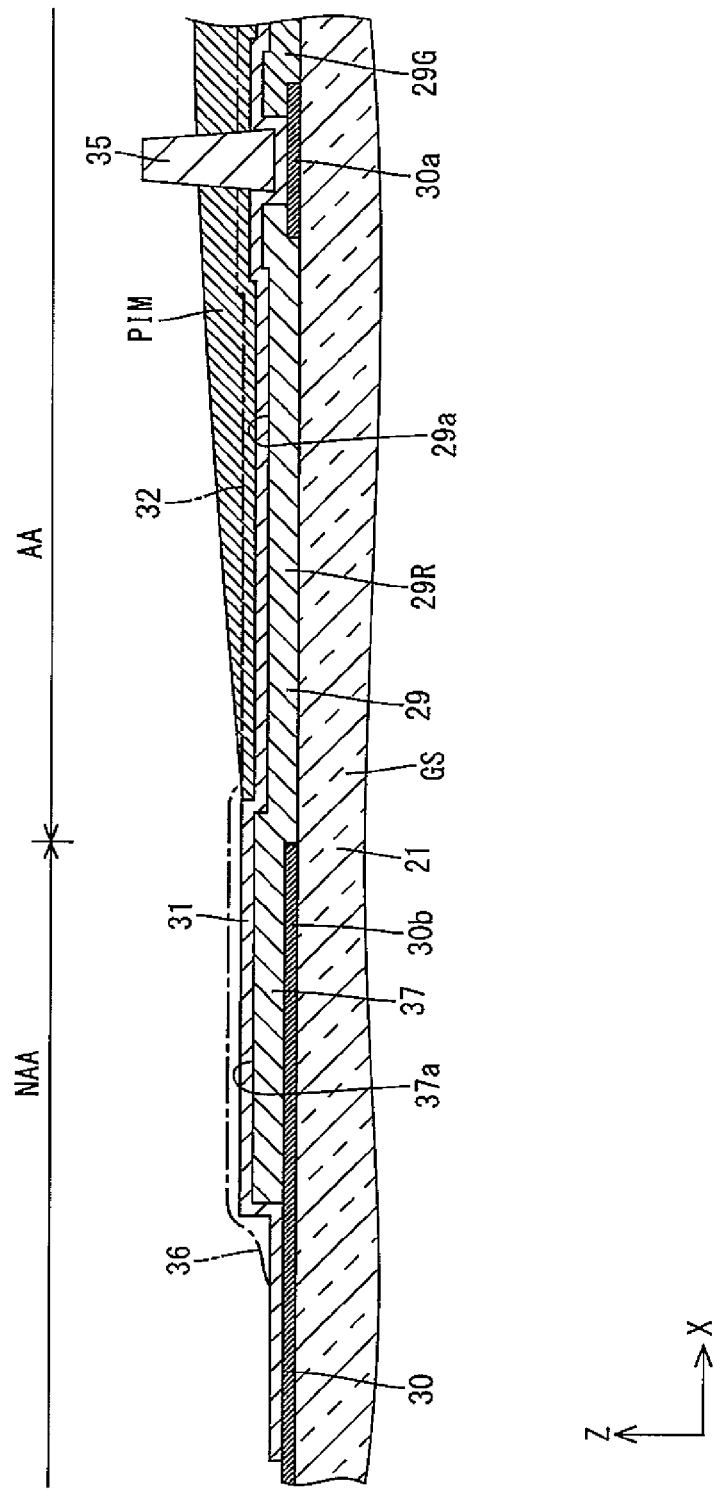
FIG. 11 is a cross-sectional view of the CF board in which the material for the alignment film is supplied in the display area in the manufacturing process of the CF board.

If the amount of the droplet PIM for forming the CF board side alignment film 32 supplied by the ink jet device to the display area AA of the glass substrate GS, which constitutes the CF board 21, is greater than the amount illustrated in FIG. 10, the droplet PIM for forming the CF board side alignment film 32 may go over the film forming control portion 37, as illustrated in FIG. 11. Even in such a case, the clearance C2 generated between the film forming control portion 37 and the sealing member 23 (see FIG. 8) is less likely to cause the droplet PIM for forming the CF board side alignment film 32 to reach a position where the sealing member 23 is to be formed. According to such a configuration, the CF board side alignment film 32 may not overlap the sealing member 23 and the sealing property of the sealing member 23 is less likely to be adversely affected.

Figure 12:
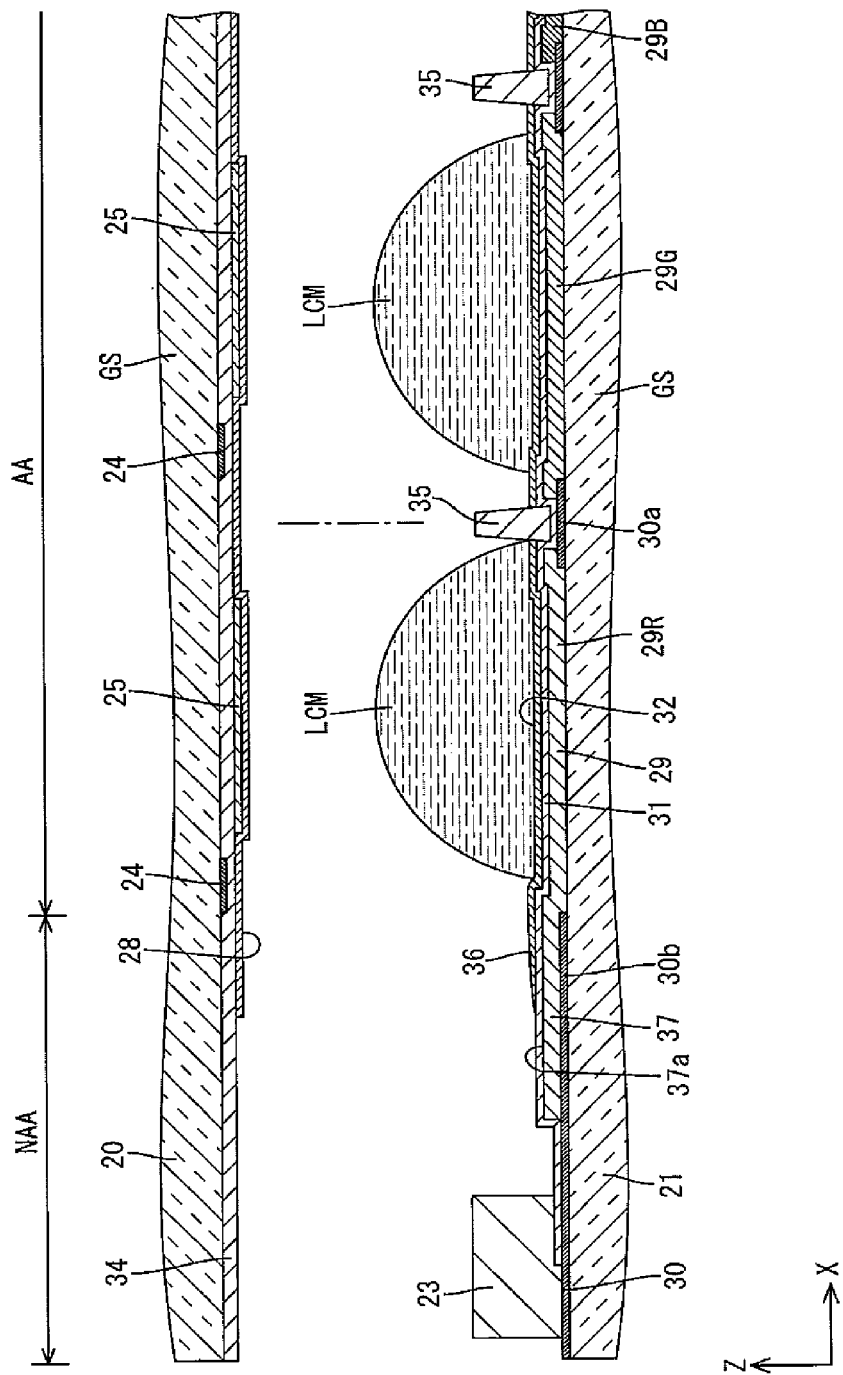
FIG. 12 is a cross-sectional view of the CF board and the array board that are not attached to each other.

Next, the bonding process will be described. As illustrated in FIG. 12, in the bonding process, after the material for forming the sealing member 23 is applied on the outer peripheral portion of the non-display area NAA of the CF board 21 with drawing by a seal dispenser, liquid crystal material droplets LCM for forming the liquid crystals 22 are dropped on the display area AA of the CF board 21 at predetermined intervals. Then, the array board 20 is arranged opposite the CF board 21 and positioned with respect to the plate surface direction and bonded to the CF board 21. As the boards are further pressed with bonding, the liquid crystal material droplets LCM for forming the liquid crystals 22 spread between the boards 20 and 21. The clearance C1 is between the array board 20 and both of the counter electrode 31 and the CF board side alignment film 32 that are on the film forming control portion 37. The film forming control portion 37 is disposed in the non-display area NAA and has a frame-like shape surrounding the display area AA. According to such a configuration, the liquid crystal material droplets LCM for forming the liquid crystals 22 flow from the display area AA side toward the non-display area NAA through the clearance C1 and reach the sealing member 23. Accordingly, the space between the boards 20 and 21 is filled with the liquid crystals 22 evenly in the display area AA and the non-display area NAA, and air is less likely to remain in the space and bubbles are less likely to be generated in the liquid crystals 22. Thus, the display quality is improved. After the boards 20 and 21 are bonded together, the sealing member 23 is cured to seal the liquid crystals 22, and the liquid crystal panel 11 is manufactured.

As described before, the CF board (a display component) 21 of this embodiment includes the glass substrate (a base board) GS, the color filter (a display element) 29, the CF board side alignment film (an alignment film) 32, and the film forming control portion 37. The glass substrate GS is defined into the display area AA and the non-display area NAA surrounding the display area AA. The color filter 29 is disposed to overlap a surface of the glass substrate GS in the display area AA. The CF board side alignment film 32 is disposed to cover the color filter 29 at least in the display area AA and partially includes the thickness variation portion 36 that gradually decreases in film thickness thereof as is closer to an outer edge thereof. The film forming control portion 37 is disposed next to the display area AA and overlaps the surface of the glass substrate GS in the non-display area NAA. Accordingly, the CF board side alignment film 32 is formed so that the thickness variation portion 36 is disposed in the non-display area NAA.

In forming the CF board side alignment film 32, the material for the CF board side alignment film 32 that is in a liquid state is applied on the display area AA of the glass substrate GS where the color filter 29 is disposed. The material flows and spreads on the glass substrate GS to form the CF board side alignment film 32. The color filter 29 overlaps the surface of the display area AA of the glass substrate GS. Therefore, level difference is caused between the surface 29a of the color filter 29 and the surface of the glass substrate GS in the non-display area NAA. According to such a configuration, when the CF board side alignment film 32 is formed, the CF board side alignment film 32 may partially include the thickness variation portion 36 in the display area AA. The thickness variation portion 36 decreases the thickness thereof toward the outer edge thereof. The film forming control portion 37 is disposed to overlap the surface of the glass substrate GS in a portion of the non-display area NAA next to the display area AA. Therefore, the CF board side alignment film 32 is formed such that the thickness variation portion 36 is disposed in the non-display area NAA. Accordingly, the thickness of the CF board side alignment film 32 is uniform in the display area AA, and display quality of display using the CF board 21 is improved.

The film forming control portion 37 surrounds the entire periphery of the display area AA. According to such a configuration, in forming the CF board side alignment film 32, the film forming control portion 37 surrounding the entire periphery of the display area AA restricts the CF board side alignment film 32 to be formed such that the thickness variation portion 36 is in the non-display area NAA. Therefore, the thickness variation portion 36 is not formed in the display area AA.

The film forming control portion 37 is formed such that the surface 37a thereof is at a height greater than a height of the surface 29a of the color filter 29. According to such a configuration, when the material for forming the CF board side alignment film 32 is applied on the display area AA to form the CF board side alignment film 32, the material stays within the display area AA by the film forming control portion 37 that surrounds the entire periphery of the display area AA and whose surface 37a is at a height greater than a height of the surface 29a of the color filter 29. Then, the material goes on the film forming control portion 37 and flows toward the non-display area NAA. Accordingly, the thickness variation portion 36 is further reliably disposed in the non-display area NAA and the thickness of the CF board side alignment film 32 is effectively uniform in the display area AA.

The array board (a second base board) 20, the liquid crystals 22, and the sealing member 23 are further included. The array board 20 is bonded to the glass substrate GS, which constitutes the CF board 21, to be opposed thereto with a distance therebetween. The liquid crystals 22 are sandwiched between the glass substrate GS and the array board 20. The sealing member 23 is between the glass substrate GS and the array board 20 and surrounds and seals the liquid crystals 22. The film forming control portion 37 is disposed closer to the display area AA than the sealing member 23 and spaced from the array board 20 with the clearance C1. According to such a configuration, the liquid crystals 22 sandwiched between the array board 20 and the glass substrate GS, which constitutes the CF board 21, are sealed by the sealing member 23 that surrounds the liquid crystals 22. The film forming control portion 37 disposed on the glass substrate GS is spaced from the array board 20 with the clearance C1 therebetween. Therefore, when the liquid crystals 22 that are dropped in the display area AA spread according to the bonding of the glass substrate GS and the array board 20, the liquid crystals 22 easily reach the sealing member 23 through the clearance C1 between the film forming control portion 37 and the array board 20. Accordingly, air is less likely to stay within the space surrounded by the sealing member 23 between the boards GS and 20. Therefore, air bubbles are less likely to be generated in the liquid crystals 22 and display quality of display using the CF board 21 is less likely to be deteriorated.

The light blocking portion 30 is further provided at least in the non-display area NAA. The light blocking portion 30 overlaps the surface of the glass substrate GS, which constitutes the CF board 21, and projects less than the color filter 29. The film forming control portion 37 overlaps the surface of the light blocking portion 30 in the non-display area NAA. According to such a configuration, the light blocking portion 30 that overlaps the surface of the glass substrate GS at least in the non-display area NAA projects less than the color filter 29. Therefore, level difference is generated between the surface 29a of the color filter 29 in the display area AA and the surface of the light blocking portion 30 in the non-display area NAA. The thickness variation portion 36 may be likely to be formed in a part of the CF board side alignment film 32 due to the level difference. The film forming control portion 37 overlaps the surface of the light blocking portion 30 in the non-display area NAA. According to such a configuration, the CF board side alignment film 32 is formed such that the thickness variation portion 36 is formed in the non-display area NAA and therefore, the thickness of the CF board side alignment film 32 is effectively uniform in the display area AA.

The film forming control portion 37 is made of the material same as the color filter 29 and has the thickness T1 equal to the thickness T2 of the color filter 29. According to such a configuration, the film forming control portion 37 is formed in the process of forming the color filter 29 in manufacturing the CF board 21. When the color filter 29 and the film forming control portion 37 having the same thicknesses T1 and T2 are formed with patterning by the photolithography method, complicated photo masks such as a half tone mask or a gray tone mask are not necessary. Therefore, the film forming control portion 37 is easily formed at low cost.

The display element corresponds to the color filter 29 that selectively transmits light having a specific wavelength region therethrough and the film forming control portion 37 is made of the same material as that of the color filter 29. If the film forming control portion is made of the same material as that of the light blocking portion 30 and the light blocking portion 30 and the film forming control portion are formed with patterning by the photolithography method, a half tone mask or a gray tone mask is necessary as a photo mask. In this embodiment, the film forming control portion 37 is made of the same material as that of the color filter 29. Therefore, a half tone mask or a gray tone mask is not necessarily used as the photo mask and the film forming control portion 37 is easily formed at low cost.

The color filter 29 includes the color portions 29R, 29G, 29B that are arranged in a matrix with a planar arrangement in the display area AA. The film forming control portion 37 is continuous from one of the color portions 29R, 29G, 29B that is at the edge of the display area AA. According to such a configuration, any step or gap is less likely to be generated between the film forming control portion 37 and the color portion 29R, 29G, 29B that is at the edge of the display area AA. Therefore, in the above configuration, the cross-sectional shape of the CF board side alignment film 32 to be formed is less likely to be complicated and it is more effective to keep the uniformity of the thickness of the CF board side alignment film 32 compared to the configuration where the film forming control portion is disposed away from the color portion 29R, 29G, 29B that is at the edge of the display area AA.

The array board 20, the liquid crystals 22, and the sealing member 23 are further included. The array board 20 is bonded to the glass substrate GS, which constitutes the CF board 21, opposite the glass substrate GS with being spaced from the glass substrate GS. The liquid crystals 22 are sandwiched between the glass substrate GS and the array board 20. The sealing member 23 that surrounds the liquid crystals 22 and is between the glass substrate GS and the array board 20 seals the liquid crystals 22. The film forming control portion 37 is disposed near the display area AA spaced from the sealing member 23 with the clearance C2. According to such a configuration, the liquid crystals 22 sandwiched between the glass substrate GS, which constitutes the CF board 21, and the array board 20 are surrounded and sealed by the sealing member 23. The film forming control portion 37 is disposed near the display area AA spaced from the sealing member 23 with the clearance C2. Therefore, in forming the CF board side alignment film 32, even if the material for forming the CF board side alignment film 32 goes over the film forming control portion 37 and spreads to the sealing member 23 side in the non-display area NAA, the material is less likely to reach the sealing member 23. Accordingly, the CF board side alignment film 32 is less likely to overlap the sealing member 23 and the sealing property is less likely to be adversely affected.

The liquid crystal display device (a display device) 10 according to this embodiment includes the above CF board 21. According to such a liquid crystal display device 10, the CF board side alignment film 32 is formed such that the thickness variation portion 36 is in the non-display area NAA by the film forming control portion 37. Therefore, the display quality of the liquid crystal display device 10 is improved.

A television device TV according to this embodiment includes the above liquid crystal display device 10. According to such a television device TV including the liquid crystal display device 10 where the display quality is improved, television images with excellent display quality are displayed.

Second Embodiment

A second embodiment of the present technology will be described with reference to FIG. 13. In the second embodiment, a film forming control portion 137 is made of a material same as that of a light blocking portion 130. Other configurations, operations, and effects similar to those in the first embodiment will not be described.

Figure 13:
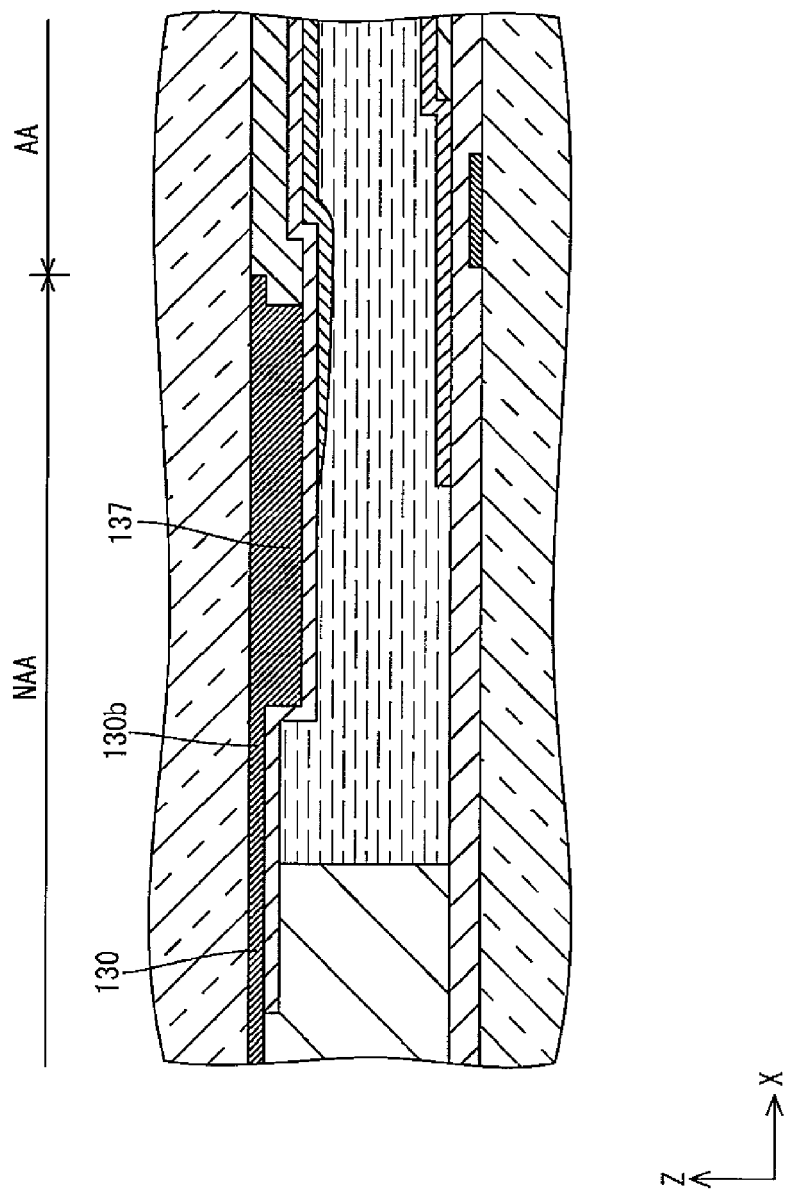
FIG. 13 is a cross-sectional view illustrating an outer edge portion of a liquid crystal panel, according to a second embodiment, cut along a long-side (X-axis) dimension thereof.

As illustrated in FIG. 13, the film forming control portion 137 according to this embodiment is made of the same material as that of the light blocking portion 130 and continuously formed from a frame-shaped light blocking portion 130b without having an interface therebetween. The film forming control portion 137 is continuous from an inner peripheral portion of the frame-shaped light blocking portion 130b. Namely, the film forming control portion 137 is formed by partially increasing the thickness of the inner peripheral portion of the frame-shaped light blocking portion 130b. In this embodiment, conditions such as wettability of the film forming control portion 137 with respect to the frame-shaped light blocking portion 130b are not necessary to be considered and therefore, the film forming control portion 137 is easily produced compared to the first embodiment.

According to this embodiment, as described before, the light blocking portion 130 is disposed at least in the non-display area NAA and overlaps the surface of the glass substrate GS. The film forming control portion 137 overlaps the light blocking portion 130 in the non-display area NAA and is made of the same material as that of the light blocking portion 130. If the film forming control portion 137 is made of a material different from that of the light blocking portion 130, the material is required to satisfy the conditions such as wettability with respect to the light blocking portion 130. On the other hand, if the film forming control portion 137 is made of the same material as that of the light blocking portion 130, such conditions are not necessary to be considered.

Third Embodiment

A third embodiment of the present technology will be described with reference to FIG. 14. In the third embodiment, an area where a film forming control portion 237 is formed is altered from that of the second embodiment. Other configurations, operations, and effects similar to the second embodiment will not be described.

Figure 14:
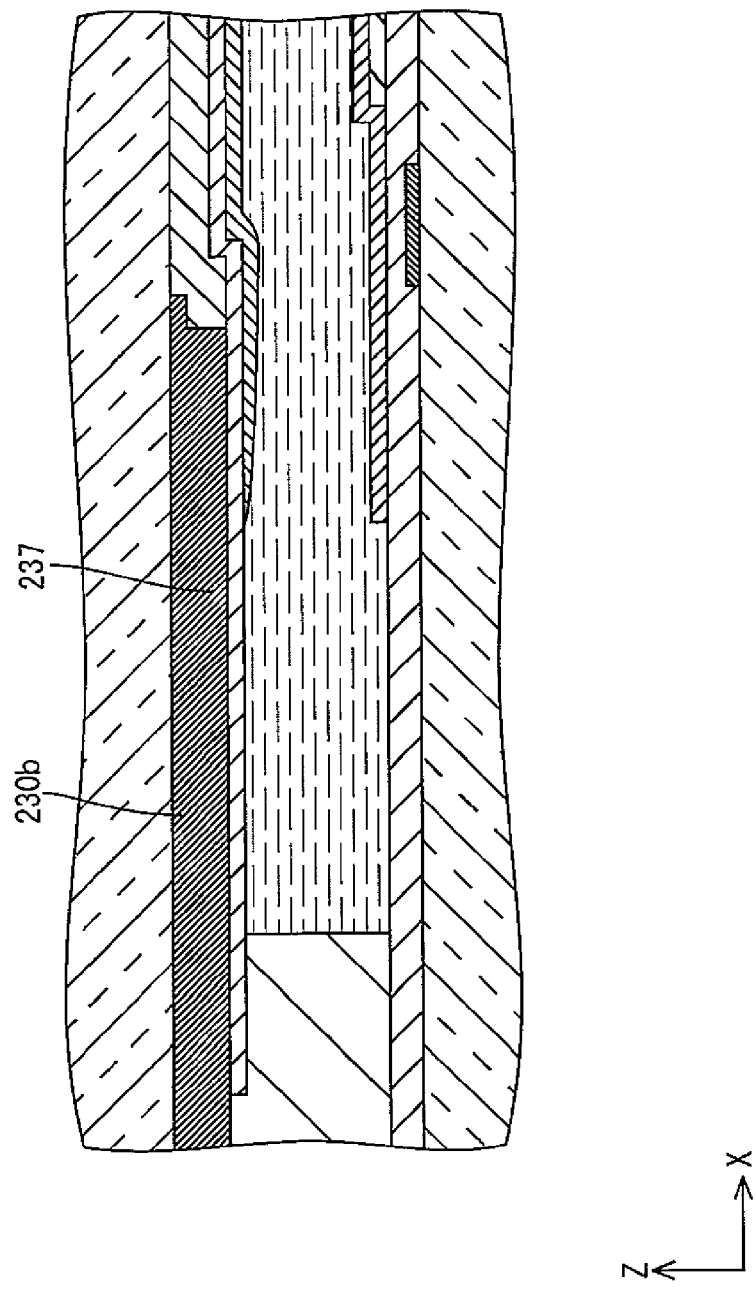
FIG. 14 is a cross-sectional view illustrating an outer edge portion of a liquid crystal panel, according to a third embodiment, cut along a long-side (X-axis) dimension thereof.

As illustrated in FIG. 14, the film forming control portion 237 of this embodiment is formed in a substantially entire area of a frame-shaped light blocking portion 230. Namely, the film forming control portion 237 is formed by increasing the thickness of the frame-shaped light blocking portion 230b than that of light blocking portions between pixels (not illustrated) over an entire area of the frame-shaped light blocking portion 230b.

Fourth Embodiment

A fourth embodiment of the present technology will be described with reference to FIG. 14. In the fourth embodiment, arrangement (an arrangement area) of a film forming control portion 337 is altered from that of the first embodiment. Other configurations, operations, and effects similar to the first embodiment will not be described.

Figure 15:
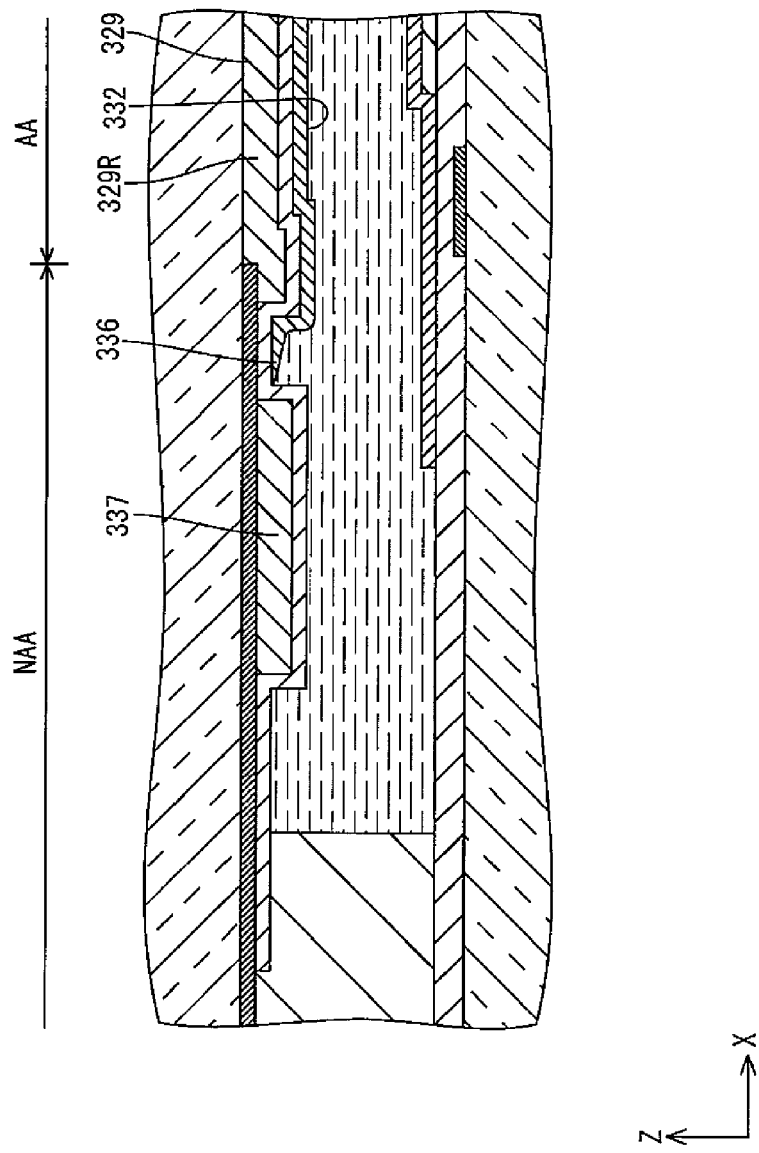
FIG. 15 is a cross-sectional view illustrating an outer edge portion of a liquid crystal panel, according to a fourth embodiment, cut along a long-side (X-axis) dimension thereof.
Figure 16:
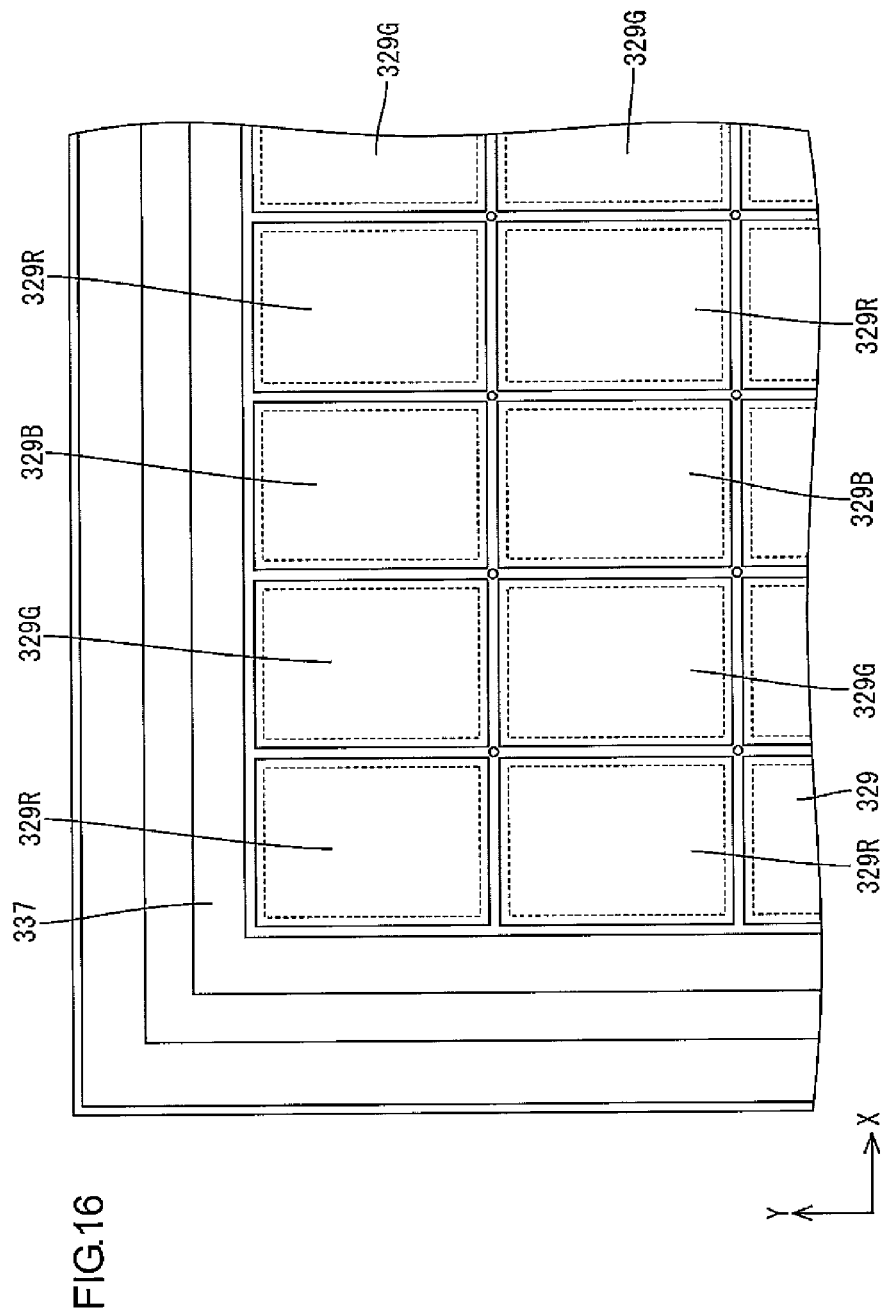
FIG. 16 is a plan view illustrating a planar configuration of a corner portion of the CF board.

As illustrated in FIGS. 15 and 16, the film forming control portion 337 of this embodiment is spaced from a color portion 329R, 329G, 329B of a color filter 329 that is at the edge of the display area AA. Namely, the film forming control portion 337 that surrounds the entire periphery of the color filter 329 is spaced from the color portion 329R, 329G, 329B that is at the edge of the display area AA. In such a configuration, a recess is formed in the non-display area NAA and between the film forming control portion 337 and the color portion 329R, 329G, 329B that is at the edge of the display area AA. A material for forming a CF board side alignment film 332 remains in the recess when forming the CF board side alignment film 332 and therefore, a thickness variation portion 336 is formed in the recess, that is, in the non-display area NAA.

Fifth Embodiment

A fifth embodiment of the present technology will be described with reference to FIG. 17. In the fifth embodiment, a thickness T3 of a film forming control portion 437 is altered from that of the fourth embodiment. Other configurations, operations, and effects similar to the fourth embodiment will not be described.

Figure 17:
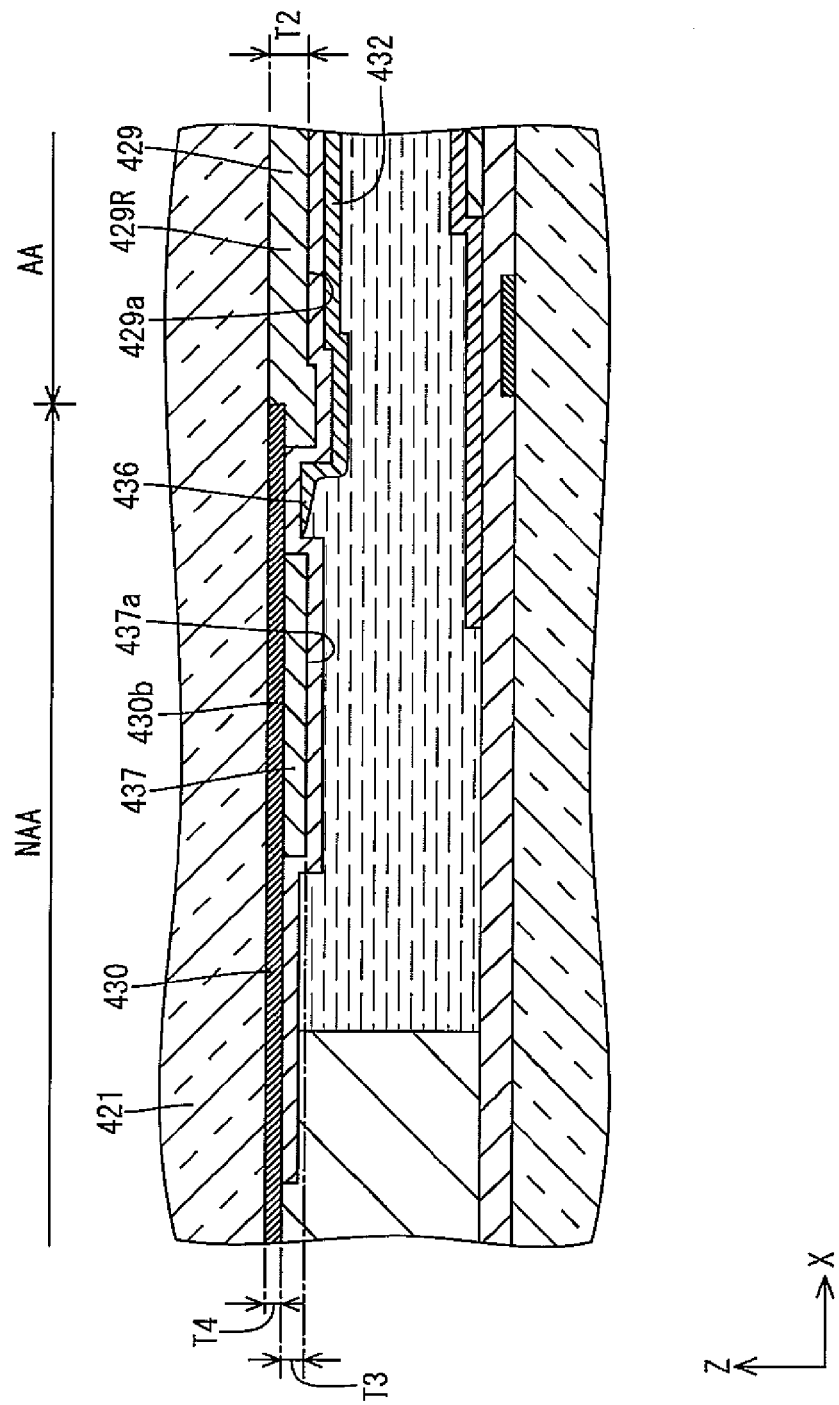
FIG. 17 is a cross-sectional view illustrating a cross-sectional configuration of an outer edge portion of the liquid crystal panel, according to a fifth embodiment, cut along a long-side (X-axis) dimension thereof.

As illustrated in FIG. 17, the thickness T3 of the film forming control portion 437 is smaller than a thickness T2 of a red color portion 439R included in a color filter 429.

Specifically, the thickness T3 of the film forming control portion 437 is determined such that difference between the thickness T3 and the thickness T2 of the red color portion 429R is equal to a thickness T4 of a frame-shaped light blocking portion 430b, which is included in a light blocking portion 430. The frame-shaped light blocking portion 430b is layered on the film forming control portion 437. Namely, a surface 437a of the film forming control portion 437 is in the same plane as a surface 429a of the red color portion 429R. The thickness T3 of the film forming control portion 437 is smaller than a thickness of each of a green color portion and a blue color portion (not illustrated) included in the color filter 429. According to such a configuration, the film forming control portion 437 effectively cancels level difference between a surface of a portion of the non-display area NAA that is next to the display area AA of a CF board 421 and a surface of a portion of the display area AA that is next to the non-display area NAA before forming the CF board side alignment film 432. Therefore, the CF board side alignment film 432 is formed such that a thickness variation portion 436 is not disposed in the display area AA but in the non-display area NAA.

Sixth Embodiment

A sixth embodiment of the present technology will be described with reference to FIG. 18. In the sixth embodiment, a thickness T5 of a film forming control portion 537 is altered from that of the fourth embodiment. Other configurations, operations, and effects similar to the first embodiment will not be described.

Figure 18:
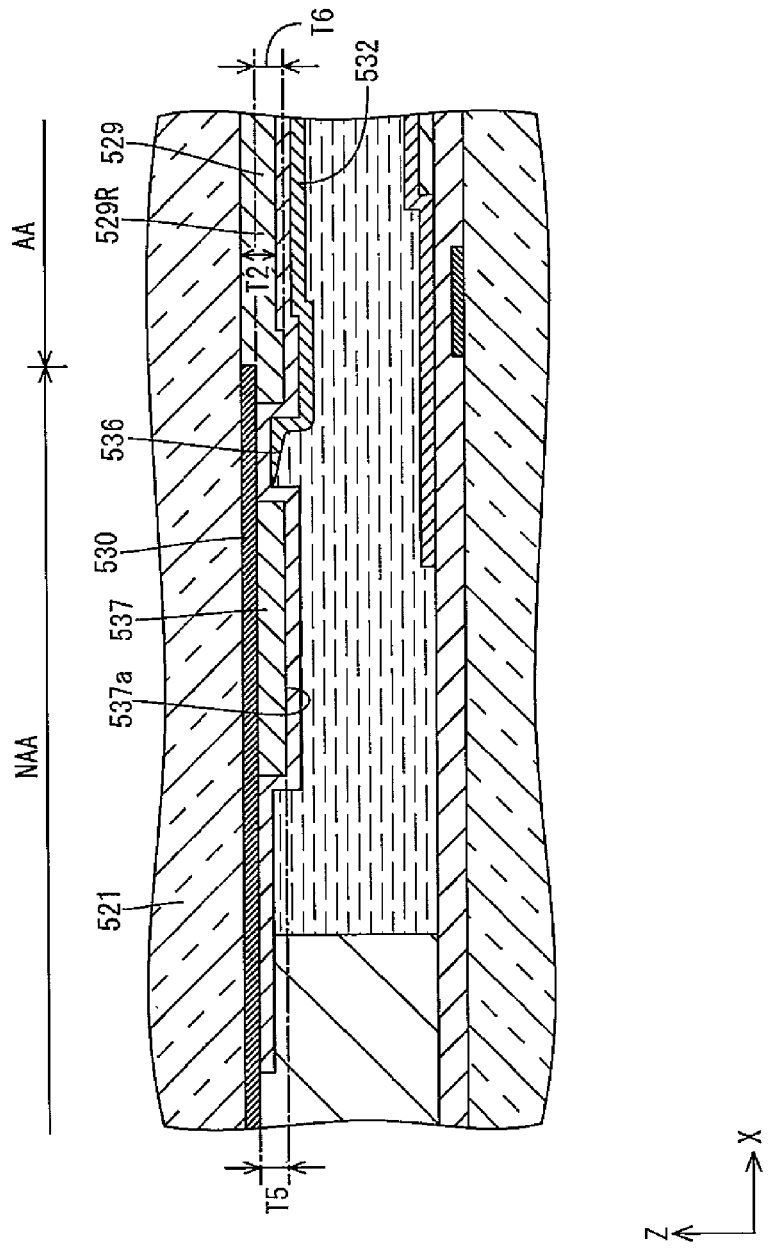
FIG. 18 is a cross-sectional view illustrating a cross-sectional configuration of an outer edge portion of the liquid crystal panel, according to a sixth embodiment, cut along a long-side (X-axis) dimension thereof.

As illustrated in FIG. 18, a portion of a red color portion 529R included in a color filter 529 is on a light blocking portion 530 and a film forming control portion 537 has a thickness T5 that is substantially equal to a thickness T6 of the portion of the red color portion 529R. Specifically, the thickness T5 of the film forming control portion 537 is smaller than a thickness T2 of the red color portion 529R included in the color filter 529 and is substantially equal to the thickness T6 of the portion of the red color portion 529R that is on the light blocking portion 530. Therefore, a surface 537a of the film forming control portion 537 is in the same plane as a surface of the portion of the red color portion 529 that is on the light blocking portion 530. According to such a configuration, the film forming control portion 537 effectively cancels level difference between a surface of a portion of the non-display area NAA that is next to the display area AA of a CF board 521 and a surface of a portion of the display area AA that is next to the non-display area NAA before forming the CF board side alignment film 432. Therefore, the CF board side alignment film 532 is formed such that a thickness variation portion 536 is not disposed in the display area AA but in the non-display area NAA.

Seventh Embodiment

A sixth embodiment of the present technology will be described with reference to FIG. 19. In the seventh embodiment, a thickness T7 of a film forming control portion 637 is altered from that of the fourth embodiment. Other configurations, operations, and effects similar to the first embodiment will not be described.

Figure 19:
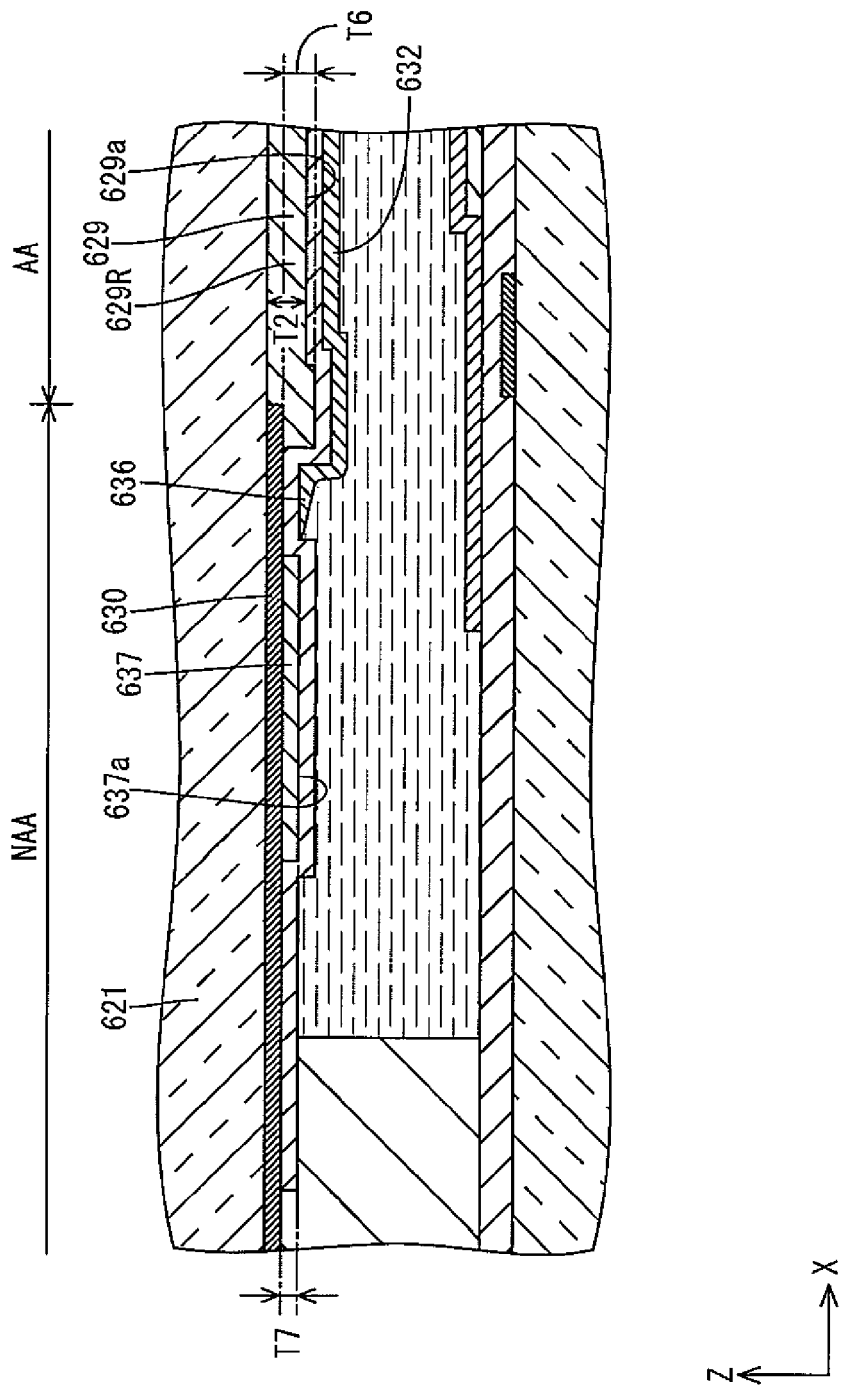
FIG. 19 is a cross-sectional view illustrating a cross-sectional configuration of an outer edge portion of the liquid crystal panel, according to a seventh embodiment, cut along a long-side (X-axis) dimension thereof.

As illustrated in FIG. 19, the film forming control portion 637 of this embodiment has a thickness T7 that is smaller than a thickness T2 of a red color portion 629R included in a color filter 629. The thickness T7 is smaller than a thickness T6 of a portion of the red color portion 629R that is on alight blocking portion 630. The film forming control portion 637 has a surface 637a at a height smaller than a height of a surface 629a of the red color portion 629R and smaller than a height of a surface of the portion of the red color portion 629R that is on the light blocking portion 630. According to such a configuration, the film forming control portion 637 effectively cancels level difference between a surface of a portion of the non-display area NAA that is next to the display area AA of a CF board 621 and a surface of a portion of the display area AA that is next to the non-display area NAA before forming the CF board side alignment film 632. Therefore, the CF board side alignment film 632 is formed such that a thickness variation portion 636 is not disposed in the display area AA but in the non-display area NAA.

Eighth Embodiment

An eighth embodiment of the present technology will be described with reference to FIG. 20. In the eighth embodiment, a configuration of a film forming control portion 737 differs from that of the first embodiment. Configurations, operations, and effects similar to the first embodiment will not be described.

Figure 20:
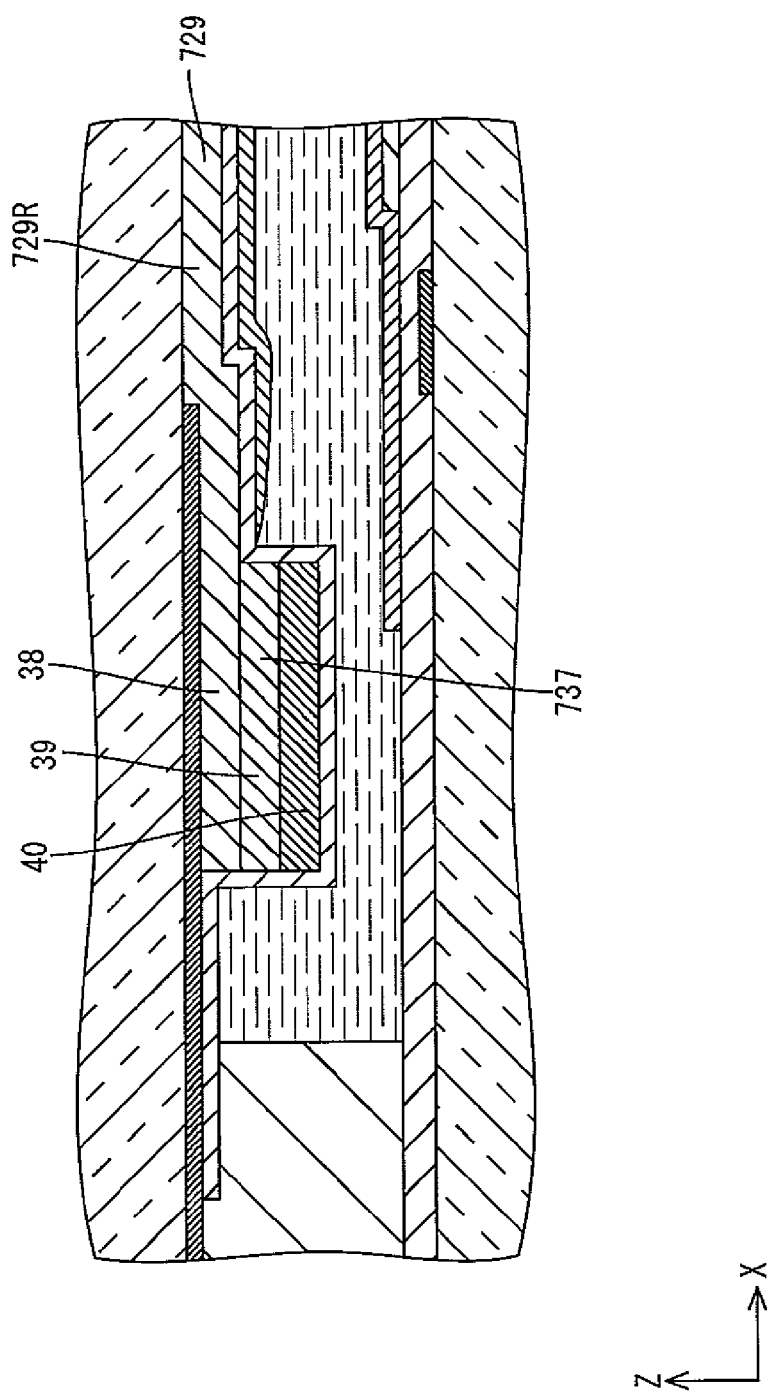
FIG. 20 is a cross-sectional view illustrating a cross-sectional configuration of an outer edge portion of the liquid crystal panel, according to an eighth embodiment, cut along a long-side (X-axis) dimension thereof.

As illustrated in FIG. 20, the film forming control portion 737 of this embodiment is constituted by laminating materials of each of the color portions 729R (only a red color portion 729R is illustrated) included in a color filter 729. Specifically, the film forming control portion 737 includes a first layer 38 made of a material same as that of the red color portion 729R, a second layer 39 made of a material same as that of the green color portion, and a third layer 40 made of a material same as that of the blue color portion. The three layers 38, 39, 40 are laminated in sequence. The first layer 38 has a thickness substantially same as a thickness of the red color portion 729R, the second layer 39 has a thickness substantially same as a thickness of the green color portion, and the third layer 40 has a thickness substantially same as a thickness of the blue color portion. Therefore, a half tone mask or a gray tone mask is not required as a photo mask that is used in forming the red color portion 729R and the first layer 38 with patterning by the photolithography method. Similarly, a photo mask is not required for forming the green color portion and the second layer 39 with patterning and a photo mask is not required for forming the blue color portion and the third layer 40 with patterning.

Ninth Embodiment

A ninth embodiment of the present technology will be described with reference to FIG. 21. In the ninth embodiment, a material of a film forming control portion 837 differs from that of the fourth embodiment. Configurations, operations, and effects similar to the fourth embodiment will not be described.

Figure 21:
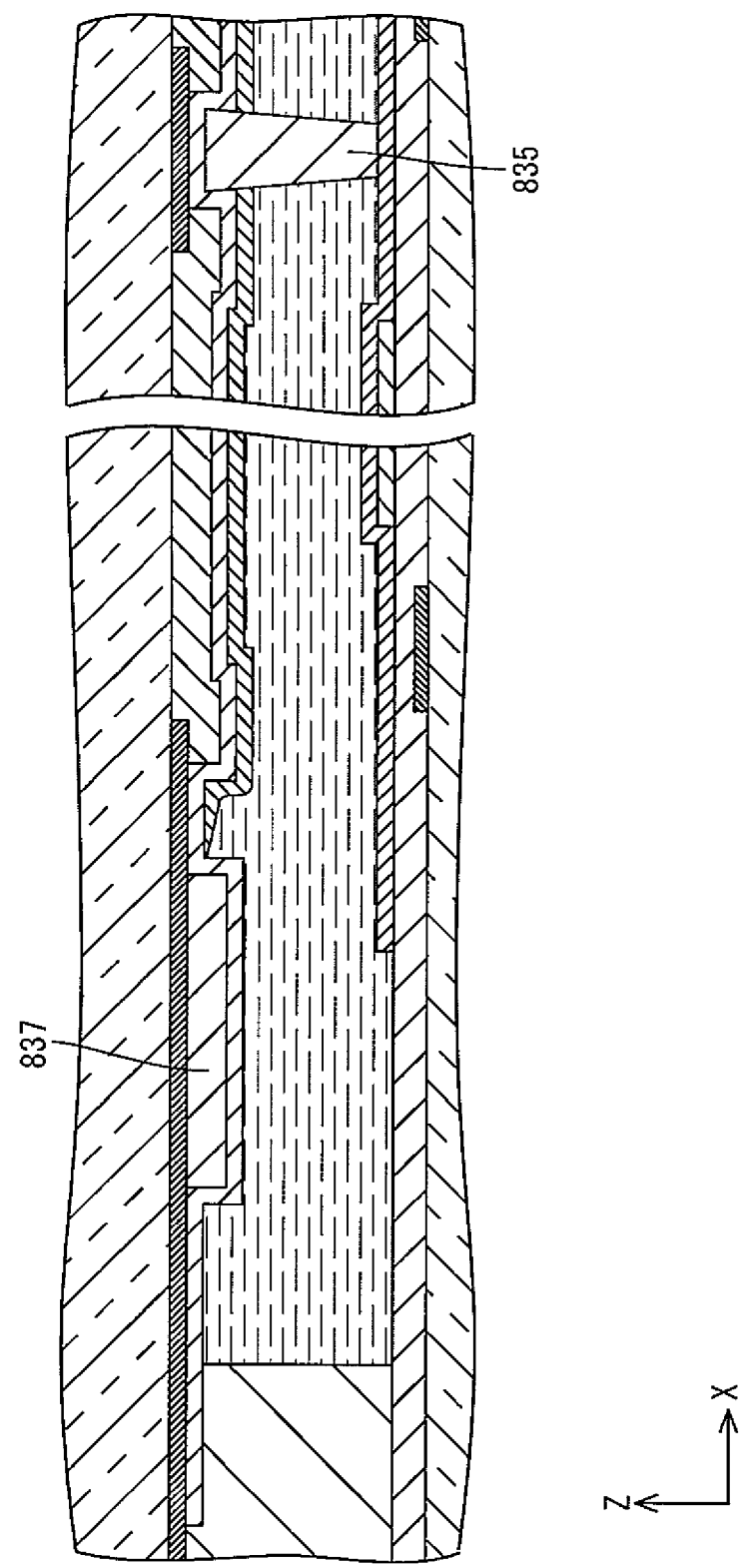
FIG. 21 is a cross-sectional view illustrating a cross-sectional configuration of an outer edge portion of the liquid crystal panel, according to a ninth embodiment, cut along a long-side (X-axis) dimension thereof.

As illustrated in FIG. 21, the film forming control portion 837 of this embodiment is made of a material same as that of a post spacer 835. Therefore, the film forming control portion 837 is formed at the same time (in the same process) of forming the post spacer 835 with patterning by the photolithography method.

Other Embodiments

The present invention is not limited to the embodiments explained in the above description with reference to the drawings. The following embodiments may be included in the technical scope of the present invention, for example.

(1) Other than each of the embodiments, a specific thickness dimension of the film forming control portion may be altered as appropriate. For example, if the thickness of each of the color portions included in the color filter differs from each other for every color, it is preferable that the thickness of the film forming control portion is determined such that a surface of the film forming control portion is at a height greater than a height of a surface of a color portion included in the color filter that has a greatest thickness.

(2) In each of the embodiments (except for the eighth and ninth embodiments), the film forming control portion is made of the material same as that of the red color portion included in the color filter. However, the film forming control portion may be made of a material same as that of the green color portion included in the color filter, or the film forming control portion may be made of a material same as that of the blue color portion.

(3) In each of the embodiments, the color filter includes color portions of three colors including red, green, and blue. However, the present invention may include a color filter including color portions of four colors including red, green, blue, and yellow. In such a configuration, the film forming control portion may be made of a material same as that of the yellow color portion.

(4) Other than the embodiment (3), the present invention may include a color filter including color portions of red, green, and blue and a colorless portion that mostly passes whole visible light and has no wavelength selectivity. In such a configuration, the film forming control portion may be made of a material same as that of the colorless portion.

(5) In the eighth embodiment, the film forming control portion has a configuration of three layers that are made of materials same as those of the respective three color portions of red, green and blue included in the color filter. However, the film forming control portion may have a configuration of two layers that are made of materials same as those of the respective two color portions selected from the three color portions. The present invention may include a film forming control portion having a configuration of two layers or three layers that are made of materials same as those of the respective two or three color portions selected from the four color portions in the embodiment (3). The present invention may include a film forming control portion having a configuration of two layers or three layers that are made of materials same as those of the respective two or three color portions selected from the three color portions and the colorless portion in the embodiment (4). The present invention may include a film forming control portion having a configuration of four layers that are made of materials same as those of the respective four color portions described in the embodiment (3) or the embodiment (4).

(6) Other than the embodiment (5), the film forming control portion may have a layered configuration including at least two layers, and the at least two layers may include a layer made of a material same as that of at least one selected from the three color portions of RGB or at least one selected from the four coloring portions and a layer made of a material same as that of a post spacer.

(7) In each of the embodiments, the film forming control portion is made of the material same as that of the color portion included in the color filter or the post spacers. However, if the CF board includes a resin layer other than the color filter or the post spacers (for example, a projection that controls alignment of liquid crystals in a liquid crystal panel of a VA type), the film forming control portion may be made of a material same as that of the resin layer. The film forming control portion may be made of a resin material that is not used for the CF board (a resin material exclusively used for the film forming control portion).

(8) In each of the embodiments, the film forming control portion has a frame shape that surrounds entire periphery of the display area. However, the present invention may be applied to a configuration where the film forming portion includes an empty portion (a disconnection portion) in a portion thereof extending along the periphery of the display area. Namely, the film forming portion may have a loop shape having ends.

(9) In each of the embodiments, the ink jet device is used to form the CF board side alignment film. However, a screen print device or a flexographic print device may be used.

(10) In each of the embodiments, the CF board side alignment film (an array board side alignment film) is made of a photo alignment material and is a photo alignment film that is subjected to an alignment process by irradiation of ultra violet rays. However, a CF board side alignment film (an array board side alignment film) that is subjected to the alignment process by rubbing may be included in the scope of the present invention.

(11) In each of the embodiments, the light blocking portion is made of photosensitive resin containing a light blocking material. However, the light blocking portion may be made of metal having a light blocking property such as chrome. Instead of glass substrates used for the array board and the CF board, a resin substrate made of substantially transparent synthetic resin (a plastic substrate) may be used.

(12) In each of the embodiments, the post spacer has a tapered columnar shape. However, the post spacer may have a tapered prism shape, or each spacer may have a constant diameter.

(13) Other than each of the embodiments, spherical spacers (space beads) may be dispersed within the display area instead of the post spacers.

(14) The semiconductor film of each TFT in the array board may include polycrystalline silicon (for example, continuous grain silicon (CG silicon)) or oxide semiconductor (for example, indium gallium zinc oxide (In—Ga—Zn—O semiconductor)) other than the amorphous silicon.

(15) In each of the embodiments, the liquid crystal display device including the backlight device 12 of an one side edge light type. However, the present invention may be applied to a liquid crystal display device of a both side edge light type.

(16) In each of the embodiments, the backlight device included in the liquid crystal display device is an edge light type. However, a backlight device of a direct type may be used.

(17) In each of the embodiments, the liquid crystal display device of a transmission type including a backlight device as an external light source is described. However, a reflection type liquid crystal display device that displays images using outside light may be included in the scope of the present invention and such a reflection type liquid crystal display device may not include a backlight device.

(18) In each of the embodiments, the TFTs are used as switching components of the liquid crystal display device. However, liquid crystal display devices that include switching components other than TFTs (e.g., thin film diodes (TFTs)) may be included in the scope of the present invention. Furthermore, black-and-white liquid crystal display devices, other than color liquid crystal display device, are also included in the scope of the present invention.

(19) In each of the embodiments, the liquid crystal panel including a liquid crystal panel that is classified as a middle sized panel is used. However, a liquid crystal display device including a liquid crystal panel that is classified as a small sized or a small to middle sized panel may be included in the scope of the present invention. Such a liquid crystal panel is used in electronic devices including portable terminal devices, mobile phones (including smart phones), notebook computers (including tablet type notebook computers), digital photo frames, portable video games, and electronic ink papers. Other than the liquid crystal display device used in a television device, liquid crystal display devices used in electronic devices including digital signage, and electronic blackboard may be included in the scope of the present invention.

EXPLANATION OF SYMBOLS

10: liquid crystal display device (display device), 11: liquid crystal panel (display panel), 20: array board (second base board), 21, 421, 521, 621: CF board (display component), 22: liquid crystals, 23: sealing member, 29, 329, 429, 529, 629, 729: color filter (display element), 29a, 429a, 629a: surface, 29R, 329R, 429R, 529R, 629R, 729R: red color portion (color portion), 29G, 329G: green color portion (color portion), 29B, 329B: blue color portion (color portion), 30, 130, 430, 530, 630: light blocking portion, 32, 332, 432, 532, 632: CF board side alignment film (alignment film), 36, 336, 436, 536, 636: thickness variation portion, 37, 137, 237, 337, 437, 537, 637, 737, 837: film forming control portion, 37a, 437a, 537a, 637a: surface, AA: display area, C1: clearance, C2: clearance, GS: glass substrate (base board), NAA: non-display area, TV: television device

The invention claimed is:

1. A display component comprising:
    a base board including a display area and a non-display area surrounding the display area;
    a light blocking portion on a surface of the base board in the non-display area;
    a display element on a surface of the base board in the display area, the display element including a color filter layer that selectively transmits light having a specific wavelength region;
    a film forming control portion on the light blocking portion in the non-display area, the film forming control portion being made of a same material as that of the color filter layer and integral with and extending continuously from the color filter layer; and
    an alignment film disposed in the display area and covering the color filter layer and the film forming control portion, and integrally including a thickness variation portion at an outer peripheral edge portion of the alignment film, a thickness of the thickness variation portion decreasing toward an outer edge thereof; wherein
    the light blocking portion overlaps the thickness variation portion,
    the color filter layer includes color portions that are arranged in a matrix with a planar arrangement in the display area, and
    the film forming control portion is continuous from one of the color portions that is at an edge of the display area.

2. The display component according to claim 1, wherein the film forming control portion surrounds an entire periphery of the display area.

3. The display component according to claim 2, wherein the film forming control portion has a surface at a height greater than a height of a surface of the color filter layer.

4. The display component according to claim 1, further comprising:
    a second base board to be attached to the base board opposite each other while having a clearance therebetween;
    liquid crystals sandwiched between the base board and the second base board; and
    a sealing member surrounding the liquid crystals and being between the base board and the second base board and sealing the liquid crystals, wherein
    the film forming control portion is closer to the display area than the sealing member and spaced from the second base board while having a clearance therebetween.

5. The display component according to claim 1, wherein the film forming control portion has a thickness equal to that of the color filter layer.

6. The display component according to claim 1,
    the film forming control portion is spaced from the sealing member while having a clearance therebetween.

7. A display device comprising the display component according to claim 1.

8. A television device comprising the display device according to claim claim 7.

* * * * *